United States Patent
Nishikawa et al.

[19]

[11] Patent Number: 5,970,175
[45] Date of Patent: Oct. 19, 1999

[54] IMAGE SIGNAL CODING SYSTEM

[75] Inventors: Hirofumi Nishikawa; Yoshihisa Yamada; Tokumichi Murakami; Kohtaro Asai, all of Kanagawa-ken, Japan

[73] Assignee: Mitsubishi Denki Kabushiki Kaisha, Tokyo, Japan

[21] Appl. No.: 09/178,619

[22] Filed: Oct. 26, 1998

Related U.S. Application Data

[62] Division of application No. 08/803,235, Feb. 20, 1997, Pat. No. 5,867,220, which is a continuation of application No. 08/121,293, Sep. 13, 1993, Pat. No. 5,638,127, which is a division of application No. 07/962,299, Oct. 16, 1992, Pat. No. 5,274,442.

[30] Foreign Application Priority Data

Oct. 22, 1991 [JP] Japan .................................. 3-273843
Apr. 2, 1992 [JP] Japan .................................. 4-80654

[51] Int. Cl.⁶ .................................................. G06K 9/36
[52] U.S. Cl. ................................................. 382/238
[58] Field of Search ................................. 382/232, 234, 382/235, 236, 237, 238, 239; 348/411, 412, 413, 414, 415, 416, 420, 421

[56] References Cited

U.S. PATENT DOCUMENTS

| | | |
|---|---|---|
| 4,437,119 | 3/1984 | Matsumoto et al. . |
| 4,546,386 | 10/1985 | Matsumoto et al. . |
| 4,571,618 | 2/1986 | Hatori et al. . |
| 4,675,733 | 6/1987 | Tanimoto . |
| 4,691,329 | 9/1987 | Juri et al. . |
| 4,703,351 | 10/1987 | Kondo . |
| 4,772,947 | 9/1988 | Kono . |
| 4,783,698 | 11/1988 | Harney . |
| 4,849,812 | 7/1989 | Borgers . |
| 4,931,869 | 6/1990 | Amor et al. . |
| 4,941,045 | 7/1990 | Birch ...................................... 382/238 |
| 5,045,938 | 9/1991 | Sugiyama . |
| 5,046,119 | 9/1991 | Hoffert et al. . |
| 5,068,724 | 11/1991 | Krause et al. . |

(List continued on next page.)

FOREIGN PATENT DOCUMENTS

| | | |
|---|---|---|
| 0385654 | 2/1989 | European Pat. Off. . |
| 490799 | 6/1992 | European Pat. Off. . |
| 499307 | 8/1992 | European Pat. Off. . |
| 510972 | 10/1992 | European Pat. Off. . |
| 0484140 | 5/1995 | European Pat. Off. . |
| 58-137379 | 8/1983 | Japan . |
| 62-102685 | 5/1987 | Japan . |
| 63-224491 | 9/1988 | Japan . |
| 1278184 | 11/1989 | Japan . |
| 220082 | 8/1990 | Japan . |
| 1688/1991 | 1/1991 | Japan . |
| 3001688 | 1/1991 | Japan . |
| 3097320 | 4/1991 | Japan . |
| 4-167882 | 6/1992 | Japan . |
| 4178088 | 6/1992 | Japan . |
| 4-252690 | 9/1992 | Japan . |
| 4-288790 | 10/1992 | Japan . |
| 5022718 | 1/1993 | Japan . |
| WO/92/10060 | 6/1992 | WIPO . |

OTHER PUBLICATIONS

Satoshi Nogaki, et al "A Study on HDTV Signal Coding with Motion Adapative Noise Reduction", Aug./Sep. 1989.

Chiang, et al. "Compatible Coding of Digital Interlaced HDTV Using Prediction of the Even Fields from the Odd Fields", Apr. 9, 1991, pp. 523–530.

*Primary Examiner*—Jose L. Couso

[57] ABSTRACT

An adaptive blocking coding system selects an effective blocking of an input image signal to be encoded in accordance with the correlation between fields, even if motion is detected between the fields. The blocking patterns include an individual field blocking, a non-interlace blocking, a split blocking and an inverted split blocking. Further, the coding system searches for motion from both odd and even fields of a frame for producing a motion compensated prediction signal in order to provide high-efficient coding.

6 Claims, 21 Drawing Sheets

U.S. PATENT DOCUMENTS

| | | |
|---|---|---|
| 5,083,720 | 1/1992 | Krause . |
| 5,091,782 | 2/1992 | Krause et al. . |
| 5,146,325 | 9/1992 | Ng .......................................... 382/238 |
| 5,157,742 | 10/1992 | Nuhara . |
| 5,193,004 | 3/1993 | Wang et al. . |
| 5,274,442 | 12/1993 | Murakami et al. ..................... 348/412 |
| 5,317,397 | 5/1994 | Odaka et al. .......................... 382/238 |
| 5,347,309 | 9/1994 | Takahashi . |
| 5,416,523 | 5/1995 | Murakami et al. . |
| 5,638,127 | 6/1997 | Murakami et al. ..................... 348/412 |

ODD FIELD

EVEN FIELD

NON-INTERLACED FRAME

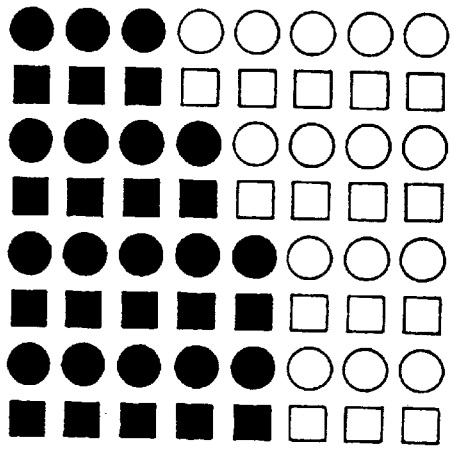
NON-INTERLACE IS SUITABLE
Fig. 3(A)
PRIOR ART
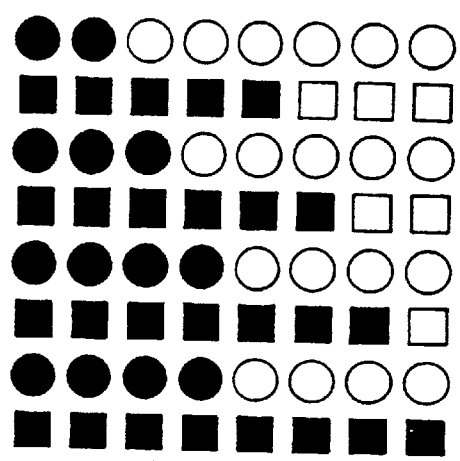
NON-INTERLACE IS NOT SUITABLE
Fig. 3(B)
PRIOR ART
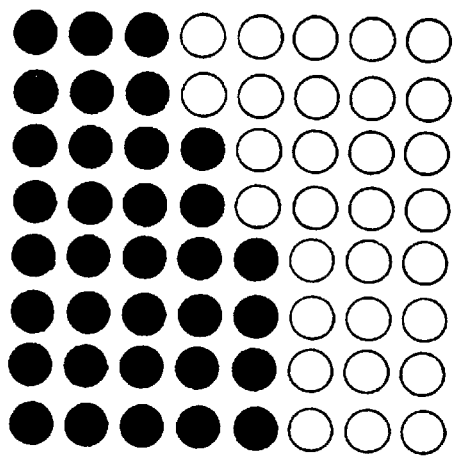 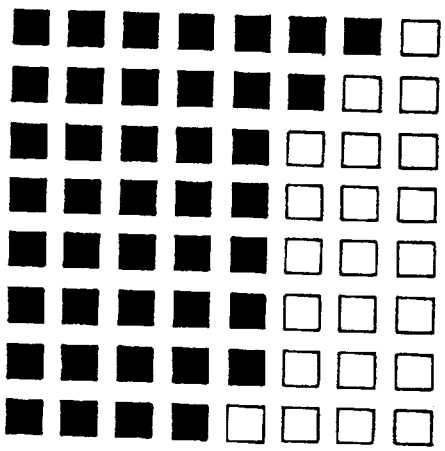
INDIVIDUAL FIELD BLOCKING IS SUITABLE
Fig. 3(C)
PRIOR ART
○ : ODD FIELD      □ : EVEN FIELD
(THIS DENOTATION IS USED ONLY HERE )

Fig. 9
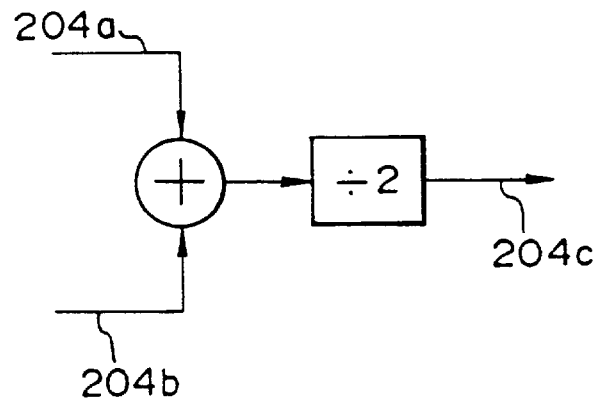
INTERPOLATION SECTION
Fig. 10(A) ODD FIELD IN THE PRECEDING FRAME
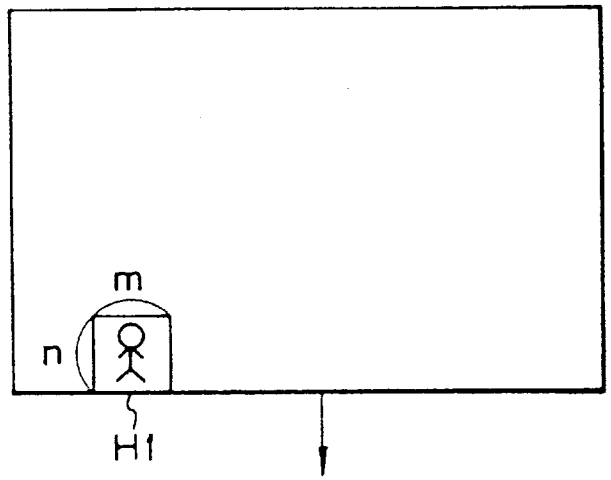
Fig. 10(B) ODD FIELD IN THE PRESENT FRAME
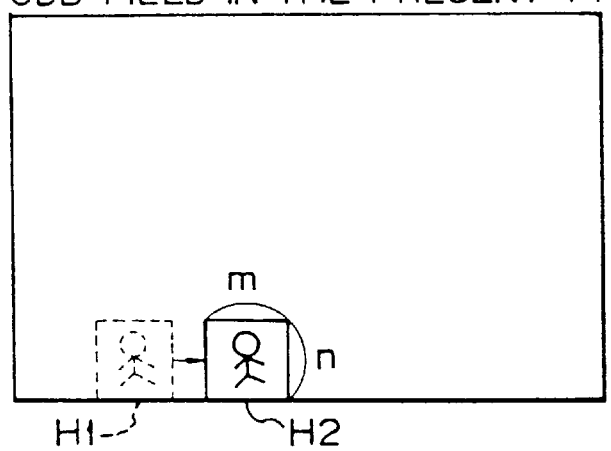

INTERPOLATION SECTION

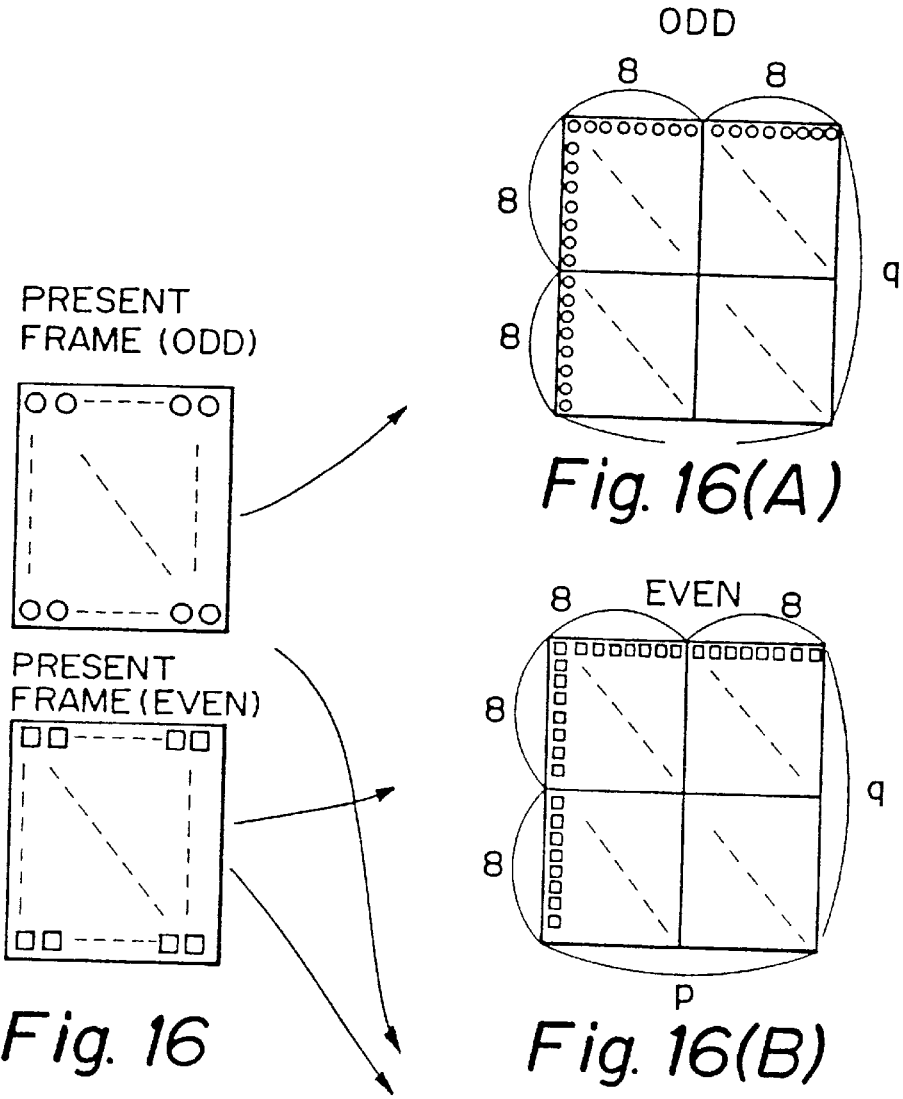
Fig. 16
Fig. 16(A)
Fig. 16(B)
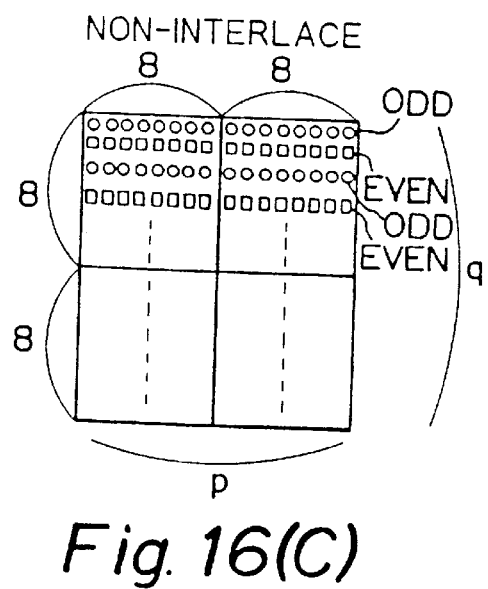
Fig. 16(C)

BLOCKING FORMING SECTION

BLOCKING DECOMPOSING SECTION

ACCUMULATED FREQUENCY COMPONENTS

IMAGE SIGNAL CODING SYSTEM

This application is a divisional of application Ser. No. 08/803,235 filed on Feb. 20, 1997, now U.S. Pat. No. 5,867,220, which is a continuation of application Ser. No. 08/121,293, filed Sep. 13, 1993, now U.S. Pat. No. 5,638,127, which is a divisional of application Ser. No. 07/962,299 filed Oct. 16, 1992, now U.S. Pat. No. 5,274,442, the entire contents of which are hereby incorporated by reference.

BACKGROUND OF THE INVENTION:

1. Field of the Invention

The present invention relates to an image coding system for coding an image signal with high efficiency.

2. Description of the Prior Art

As is known in the art, means for eliminating redundant components-included in an image signal is used for coding an image signal. A typical approach to image coding is the transform coding method wherein an image is divided into blocks, an orthogonal transform is carried out for each of the blocks, and the transform coefficients are encoded.

In the case of television signals such as an NTSC signal, interlaced scanning is used whereby an image signal of one frame is scanned twice, once in the odd field and once in the even field. The two fields scan different but complementary spaces of an image. The fields have image information at different times but there is a relatively strong correlation therebetween because the scanned lines of the two fields are alternate and adjacent. There is a technique in which coding is carried out after combining the fields and dividing them into blocks when coding an image signal produced by the interlaced scanning.

FIG. 1 is a block diagram showing the structure of an embodiment of "High Efficiency Image Coding System" described in the Japanese Patent Public Disclosure No. 1688/1991. In FIG. 1, the coding system includes a non-interlacing section 1, a motion detecting section 2, a non-interlace blocking section 3, an individual field blocking section 4, an orthogonal transform section 5, a quantizing section 6 for quantizing a conversion coefficient at the output of the orthogonal transform section 5, and coding section 7.

In operation, a series of input image signals 100, which are produced by the interlaced scanning method and applied to each field, are converted to a non-interlaced signal 101 in the non-interlacing section 1 as indicated in FIG. 2(C). As shown, the pixels belonging to the odd field and the pixels belonging to the even field appear alternately in every other line.

When an object is stationary and the correlation between adjacent lines is high, it is effective to use a non-interlaced signal and to code the image signal in a block including components from both fields. FIG. 3(A) shows an example of such a condition. On the other hand, when an object is moving, the correlation between adjacent lines is lowered and it is considered to be effective to execute the coding in units of individual fields. This is because a non-interlaced signal is used for the moving object results in discontinuation as shown in FIG. 3(B), causing a power to be generated in high frequency coefficients during the transform coding. In this case, the blocking as indicated in FIG. 3(C) is adequate.

Thus, the motion detector 2 detects the motion of an object and changes the operation when the object is detected as being stationary by a signal 103 indicating motion, to conduct the blocking shown in FIG. 3(A) (hereinafter, this arrangement of FIG. 3(A) is called the non-interlace blocking) in the non-interlace blocking circuit 3. If the object is detected to be moving, the motion detector 2 changes the operation to conduct the blocking shown in FIG. 3(C) (hereinafter, this arrangement of FIG. 3(C) is called the individual field blocking) in the individual field blocking circuit 4.

The blocks obtained by changing the blocking as explained above are subjected to the discrete cosine transformation (DCT) in the orthogonal transform section 5. The transform coefficients obtained as described above are quantized in the quantizing section C, and a variable length code is assigned in the coding section 7 in accordance with the occurrence probability of respective events.

Since a conventional image coding system has been structured as described above, it has been difficult to realize the blocking utilizing the correlation between fields when an object is moving. Moreover, such a system has not utilized the property of different intensities in power distribution of the coefficients after conversion caused by the difference in arrangement of pixels within the block. In addition, there is the difference in power between the stationary blocks and moving blocks, the moving blocks having a high signal power which has not been utilized.

FIG. 4 is a block diagram of another conventional inter-frame predictive coding system described, for example, in the transactions on the 3rd HDTV International Work Shop, "A Study on HDTV Signal Coding with Motion Adaptive Noise Reduction" (Vol 3, 1989). In FIG. 4, this system comprises a frame memory 21, a motion detecting section 22, a subtracter 23, a coding section 24, a local decoding section 25, an adder 26 and a multiplexing section 27. Although omitted in this figure, the encoded data is decoded at a receiving side in order to reproduce the transmitted signal.

In operation, the motion of an object between the current field and the field of the same type of the preceding frame is detected block by block, the block consisting of a plurality of pixels of an input image signal 201 which is provided by the interlaced scanning method and formed of frames, each frame having both odd and even fields. The motion between odd fields is detected in the motion detecting section 22 by searching the block which has the most distinctive resemblance to the currently processing block among the already encoded blocks 202, adjacent to the position corresponding to the currently processing block in the odd fields stored within the frame memory 21. The degree of resemblance is evaluated by using an absolute sum of differential values or a square sum of differential values of the corresponding pixels in both blocks. The amount of motion in both horizontal and vertical directions between the current block and the block determined to be the most similar is provided as a motion vector 203. The frame memory 21 outputs a motion compensated prediction signal 204 corresponding to this motion vector 203.

A prediction error signal 205 obtained in the subtracter 23 by subtracting the motion compensated prediction signal 204 from the input signal 201 is applied to the coding circuit 24 in which the spatial redundancy is removed. Since low frequency components of an image signal generally occupy a greater part of the power thereof, information can be compressed by quantizing high power portions with a large number of bits and quantizing low power portions with a small number of bits. According to an example of this information compression method, the frequency conversion is carried out for an 8×8 pixels block by conducting an orthogonal transform such as a discrete cosine transform to scalar-quantize the transform coefficients. The scalar-quantized coding data 206 is sent to the local decoding section 25 and to the multiplexing section 27. The multiplexing section 27 conducts multiplexing and encoding for the coding data 206 and the motion vector 203 to output these signals to a transmission line 209.

Meanwhile, the local decoding circuit 25 executes the inverse operation of the operation in the coding section 24, namely the inverse scalar quantization and inverse orthogonal transform to obtain a decoded error signal 207. The motion compensated prediction signal 204 is added to the decoded error signal 207 in the adder 26 and stored in the frame memory 21 to detect motion of the odd field of the next frame.

In addition, the motion of the even fields of the input image signal 201 with respect to the already encoded field of the frame memory 21 is also detected for the coding of the motion compensated prediction error signal. As described above, in the conventional interframe predictive coding system, redundancy with respect to time included in moving image signals is removed by the motion compensated prediction coding and redundancy with respect to space is removed by the orthogonal transform.

Since the conventional interframe predictive coding system is structured to individually encode both the odd field and even field by predicting the current (present) odd field from the odd field of the already encoded frame and predicting the current even field from the even field of the already encoded frame, the encoding efficieny is low because the spatial correlation existing between the continuous fields, produced by the interlaced scanning method, is not used.

SUMMARY OF THE INVENTION

The present invention has been proposed to overcome the problems in the prior art. Therefore it is an object of the present invention not only to adaptively discriminate between a block which is effective for non-interlace blocking and a block which is effective for individual field blocking, but also to enhance coding efficiency by adding a class of blocking so that field correlation is used even for a moving image, the quantization accuracy is controlled and the scanning sequence of transform coeffecients is changed in accordance with switching of the blocking.

It is another object of the present invention to provide a coding system for searching motion from both odd and even fields of the frame which is already encoded in order to predict each present field.

It is a further object of the present invention to provide a coding system for enabling highly efficient coding by realizing blocking for adaptively switching the field and frame in the block coding of prediction errors.

According to the first aspect of the present invention, an adaptive blocking image coding system encodes an input image signal obtained by interlaced scanning in a unit of the block of M pixels×N lines. More specifically, the adaptive blocking image coding system comprises blocking means for selectively forming a first type block including only the pixels of M pixels×N lines belonging to the odd field of the input image signal or the pixels of M pixels×N lines belonging to the even field thereof, a second type block wherein the pixels of the M pixels×N/2 lines belonging to the odd field and the pixels of the N/2 lines belonging to the even field are arranged alternately in every other line corresponding to scanning positions on a display screen, a third type block wherein the pixels of M pixels×N/2 lines belonging to the odd field are arranged in the upper or lower half of the block and the pixels of M pixels×N/2 lines belonging to the even field are arranged in the remaining half of the block, and a fourth type block wherein the pixels of M pixels×N/2 lines belonging to the odd-field are arranged in the upper or lower half of the block, the pixels of M pixels×N/2 lines belonging to the even field are arranged in the remaining half of the block and the pixels of either field are inverted upside down in the vertical direction with respect to the display screen. The system further includes blocking determining means for determining the type of blocking by the blocking means, a transform means for orthogonally transforming the block formed by the blocking means, quantizing means for quantizing the transform coefficient obtained by the transform means, and coding means for encoding the quantized index obtained by the quantizing means.

With the structure described above, the block of the M pixels×N lines if obtained by one blocking selected from the non-interlace blocking where the pixels of M pixels×N/2 lines belonging to the odd field and the pixels of M pixels×N/2 lines belonging to the even field are arranged in every other line corresponding to the scanning positions on the display screen, an arrangement (hereinafter, called split blocking) where the pixels of M pixels×N/2 lines belonging to the odd number field are arranged in the upper half or lower half block and the pixels of M pixels×N/2 lines belonging to the even field are arranged in the remaining half block, and an arrangement (hereinafter, called inverted split blocking) where the pixels of M pixels×N/2 lines belonging to the odd field are arranged in the upper or lower half block, the pixels of M pixels×N/2 lines belonging to the even field are arranged in the remaining half block and the pixels of either field are inverted in the vertical direction with respect to the display screen. The obtained block is orthogonally transformed the transform coefficients are quantized, and then the quantization index is encoded.

According to the second aspect of the present invention, the quantizing means for quantizing the transform coefficient in the adaptive blocking image coding system variably controls the quantization accuracy in accordance with the type of arrangement blocking-processed by the blocking means.

More specifically, one of the arrangements including individual field blocking, non-interlace blocking, split blocking, or inverted split blocking is orthogonally transformed, the transform coefficient is quantized and the quantizing index is encoded with the quantizing accuracy in accordance with the information, indicating the selected blocking.

According to the third aspect of the present invention, the coding means for encoding the quantizing index produced when quantizing the transform coefficient in the adaptive blocking image coding system determines the scanning sequence (path) for quantizing the transform coefficient in accordance with the type of arrangement to be blocking-processed by the blocking means.

More specifically, one of the arrangements to be blocking-processed by the individual field blocking, non-interlace blocking, split blocking, or inverted split blocking is orthogonally transformed, the transform coefficient is quantized, and the quantizing index is encoded with the quantization accuracy and the scanning sequence in accordance with the information indicating the selected blocking.

According to the fourth aspect of the present invention, the adaptive blocking image coding system comprises blocking determining means for selecting the type of arrangement to be blocking-processed in accordance with the value obtained by multiplying a predetermined weighting coefficient with the pixels of each line included in the block and then totaling such multiplied values.

More particularly, one of the arrangements to be blocking-processed by individual field blocking, non-interlace blocking, split blocking, or inverted split blocking is selected by the value obtained by multiplying the predetermined weighting coefficient with the pixels of each line included in the block and then totaling such multiplied values. The selected block is orthogonally transformed, the transform coefficient is quantized and the quantizing index is encoded.

According to the fifth aspect of the present invention, the adaptive blocking image coding system also comprises a blocking determining means for selecting the type of arrangement which has the minimum coefficient poster of a predetermined high frequency component among the transform coefficients obtained by discrete cosine transform of the block.

In other words, one of the arrangements to be blocking-processed by individual field blocking, non-interlace blocking, split blocking, or inverted split blocking is selected in such a manner that the coefficient power of the predetermined high frequency element component is the minimum among the transform coefficients obtained by discrete cosine transform of the block. The determined block is orthogonally transformed, the transform coefficient is quantized, and the quantizing index is encoded.

According to the sixth aspect of the present invention, there is provided a coding system which individually searches the motion from both odd and even fields of the already encoded frame in order to predict the field to be encoded, the system comprising the following elements:
(a) input means for inputting an input signal to be encoded;
(b) a field memory for storing signals based on the input signal by dividing it into a plurality of fields such as the odd field and even field;
(c) predictive signal output means for outputting predictive signals of a plurality of types predicting the change of input signal on the basis of signal stored in the field memory;
(d) a selector for selecting a predictive signal from the predictive signals provided by the predictive signal output means; and
(e) coding means for encoding the input signal using the relationship between the predictive signal selected by the selector and the input signal from the input means.

With such an arrangement, the coding system can provide stabilized prediction efficiency regardless of motion of an object by making reference to both fields of the already encoded frame for the purpose of prediction.

According to the seventh aspect of the present invention, the coding system is structured to realize adaptive prediction from the searched two kinds of motion compensated predictive signals and a plurality of predictive signals combining interpolation signals of these motion compensated predictive signals.

Since the coding system as constructed utilizes a predictive signal produced by interpolating the predictive signals from both fields of the already encoded frame, motion at the intermediate point of time and space of the two fields used for the prediction can be considered. Moreover, this coding system also functions as a low-pass filter, whereby the prediction efficiency can be improved and the encoded image is stabilized.

According to the eighth aspect of the present invention, the coding system executes the encoding, for example encoding prediction error signals, by adaptively switching the encoding operation from blocking of the pixels of only the odd field or even field of the frame for encodement to blocking of both odd and even fields for encodement, the system comprising the following elements:
(a) input means for inputting an input signal to be encoded by dividing into a plurality of fields such as an odd field and even field;
(b) a blocking selection section for selecting, at the time of blocking and encoding the signal from the input means, a block suitable for the encoding between the block consisting of the signal of only one kind of field and the block consisting of the signal combining signals of a plurality of fields;
(c) a block forming section for forming a block selected by the blocking selection section; and
(d) coding means for encoding a block formed by the block forming section.

The coding system having such a structure provides high efficiency encoding by selecting the blocking method most suitable for the encoding, i.e., blocking the pixels of only either of the odd field or even field, or blocking the pixels of both odd and even fields.

According to the ninth aspect of the present invention, the coding system also comprises a concrete selecting means for adaptively switching the block selection. This selecting means includes any one of the following selecting mans:
(a) selecting means for selecting the block with the least amount of encoding information from a plurality kinds of block;
(b) selecting means for selecting the block with the least amount of encoding errors from a plurality kinds of block; and
(c) selecting means for selecting the block with the least amount of high-frequency components in the signal to be encoded from a plurality kinds of block.

The coding system having such a structure enables adaptive switching of the blocking by selecting the blocking with less encoding information, the blocking with less encoding errors, or the blocking with less high frequency components included in the signal to be encoded, from the blocking of the pixels of one of only the odd or even field or the blocking of the pixels of both odd and even fields.

BRIEF DESCRIPTION OF THE DRAWINGS

The invention will be more fully understood from the following detailed description and the accompanying drawings in which:

FIG. 3 is a diagram for explaining an adaptive blocking of the prior art;

FIG. 9 is a block diagram showing an example of the structure of an interpolating section shown in FIG. 7;

FIG. 10 is a diagram for explaining the operation of a motion detecting circuit

FIG. 16 is a diagram showing a structural example of the block selected by the blocking selecting section;

DETAILED DESCRIPTION OF THE PREFERRED EMBODIMENTS

Figure 5:
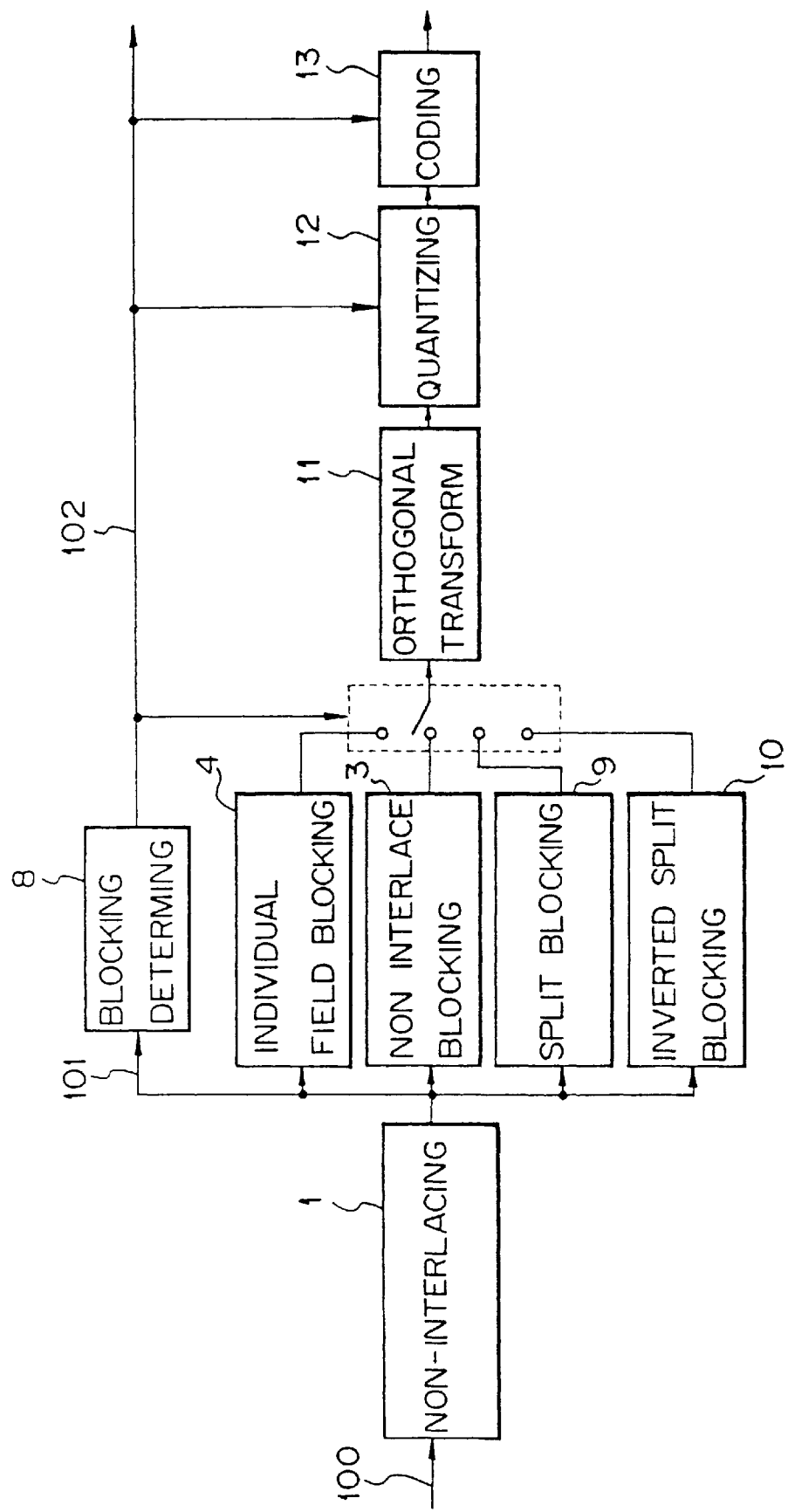
FIG. 5 is a block diagram of an embodiment of the present invention.
Figure 6:
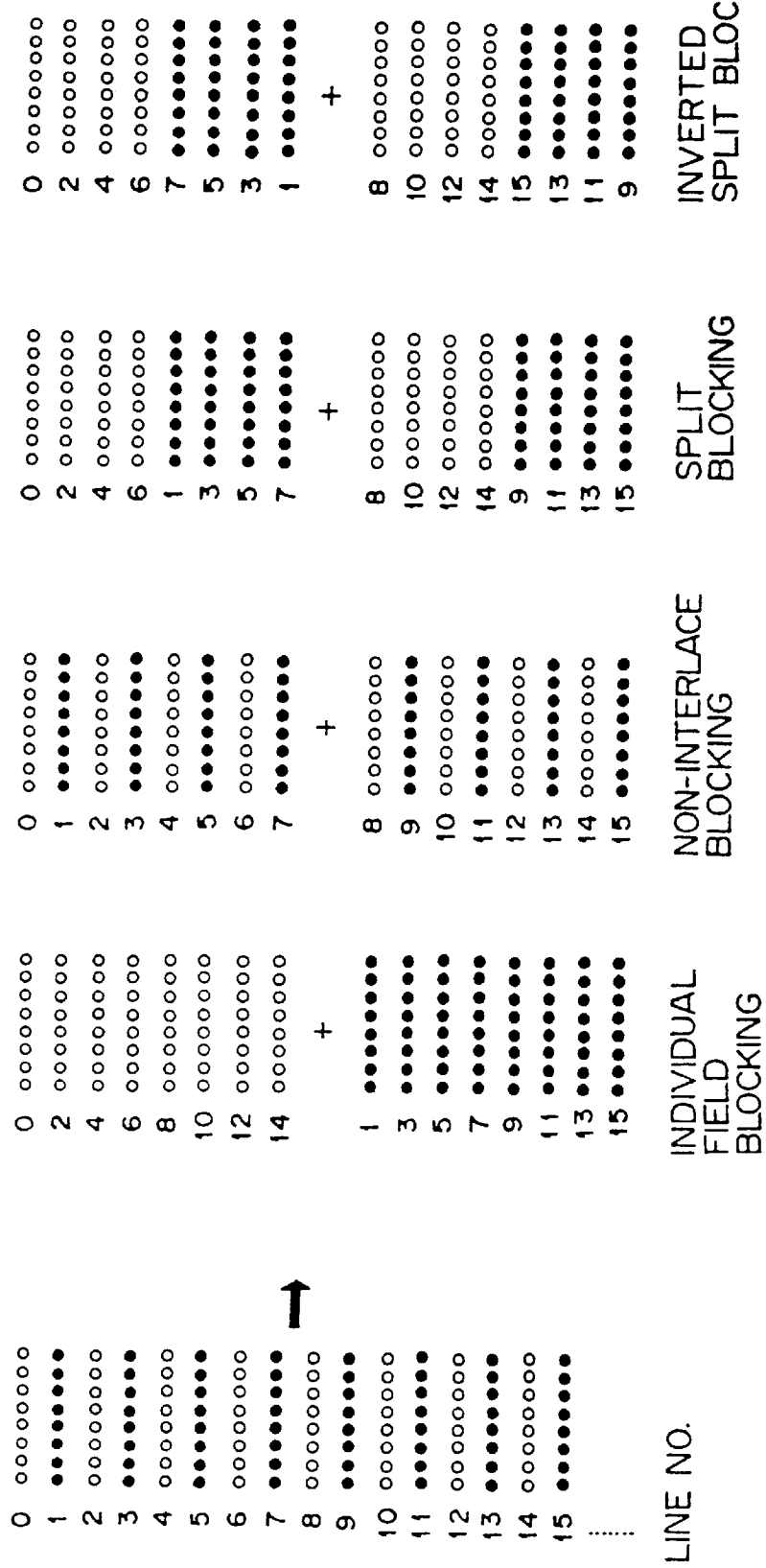
FIG. 6 is a diagram for explaining adaptive blocking in the embodiment shown in FIG. 5.

Referring to FIG. 5, an embodiment of the present invention is shown as an adaptive blocking image coding system. In FIG. 5, the image coding system comprises a non-interlacing section 1 for conducting non-interlace processing; a blocking determination section 8; an individual field blocking section 4; a non-interlace blocking section 3; a split blocking section 9; an inverted split blocking section 10; an orthogonal transform section 11; a quantizing section 12 and coding section 13. Such various types of blocking are shown in FIG. 6. FIGS. 6A–6D show individual field blocking, non-interlace blocking, split blocking and inverted split blocking, respectively.

The operation will be explained with reference to FIG. 5 and FIGS. 6A–6D. The input image signal series 100 which is scanned by the interlace scanning method and is inputted field by field is converted into a non-interlaced signal 101 in the non-interlace section 1.

Figure 1:
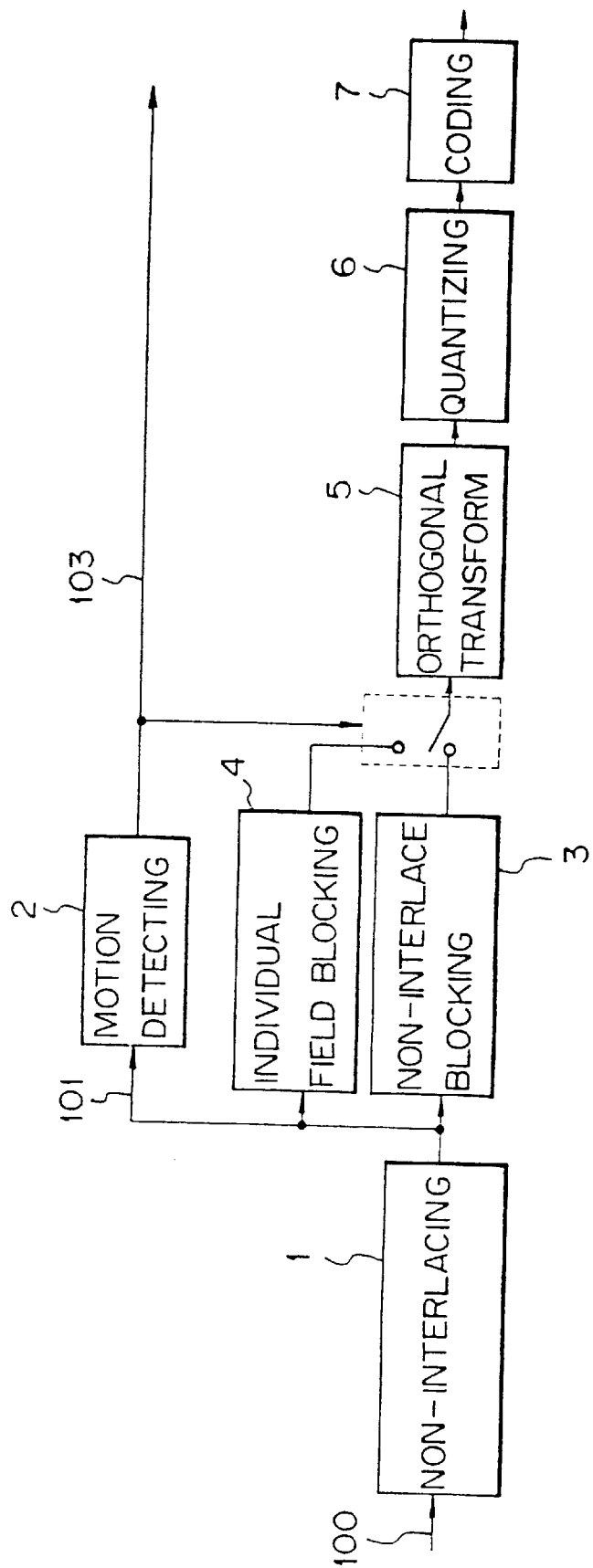
FIG. 1 is a block diagram of an image coding system in the prior art.
Figure 2A:
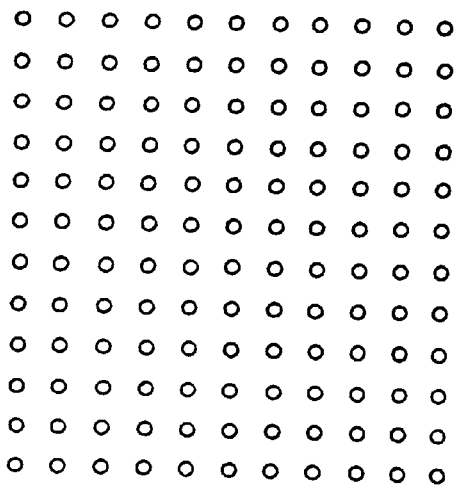
FIG. 2 is a diagram for explaining non-interlace blocking.
Figure 2B:
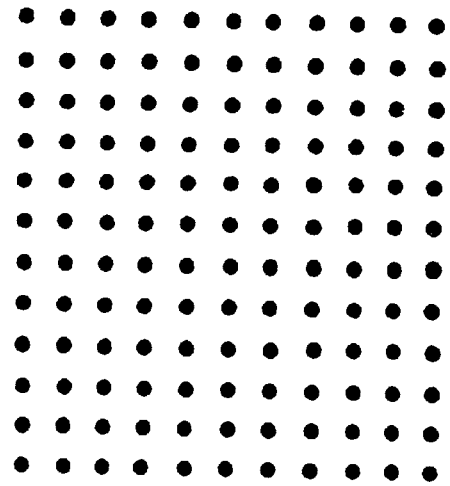
Figure 2C:
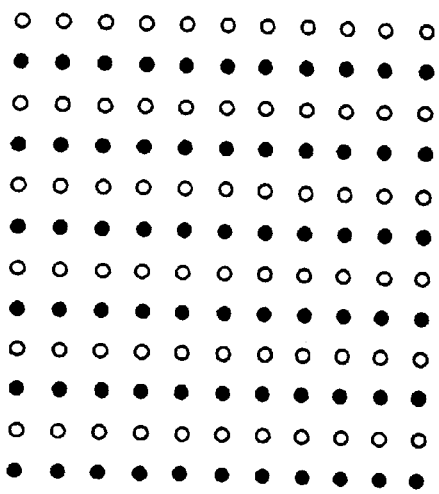
Figure 4:
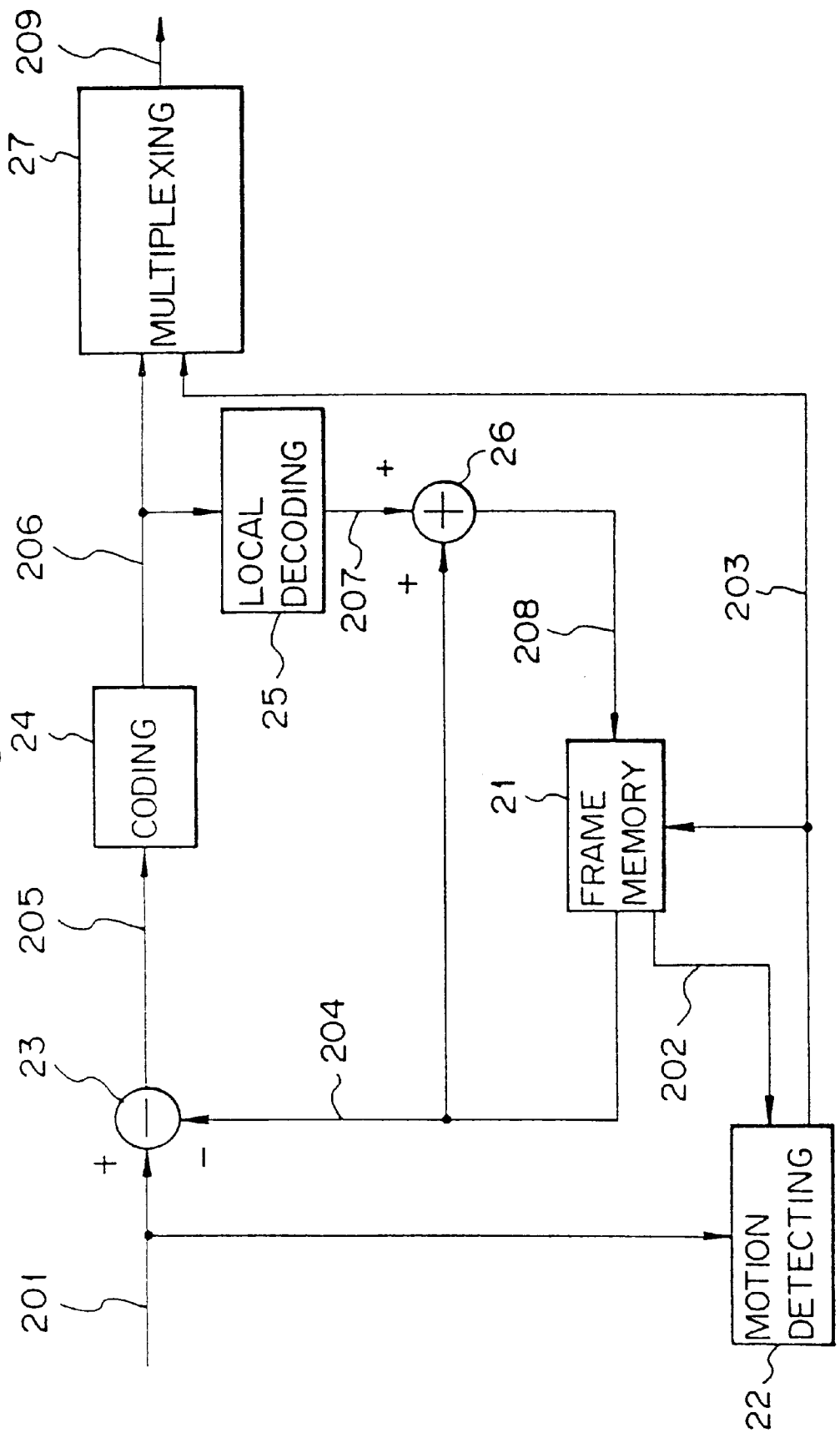
FIG. 4 is a block diagram showing the structure of another coding system of the prior art.

FIG. 2 shows a profile of non-interlace processing in the prior art similar to the non-interlace processing in the present invention. When (A) is defined as an input image signal from the odd field and (B) as an input image signal of the even field, the non-interlaced signal 101 shown in (C), alternately combining the lines from respective fields, can be obtained.

The individual field blocking section 4 executes, as shown in FIG. 6(A), blocking in which the fields are processed individually. This blocking is effective when the correlation between the fields is not available because of quick motion.

The non-interlace blocking section 3 executes the blocking shown in FIG. 6(B). In the case of a stationary or still image, a continuous image can be obtained by non-interlaced processing of the fields. The wavelength of the signal thereby becomes substantially longer, resulting in power being concentrated on low frequency components in the successive transform coding.

The split blocking section 9 conducts the blocking as shown in FIG. 6(C). This blocking is effective in the case where the correlation between the fields exists but the fields are noncontinuous when non-interlace blocking is carried out.

The inverted split blocking section 10 conducts the blocking shown in FIG. 6(D). This blocking is also effective in the case where the correlation between fields exists but the fields are noncontinuous when non-interlace blocking is carried out. This blocking prevents discontinuation at the center of the block when the split blocking method is used.

The blocking determinating section 8 determines the optimum blocking from a plurality of blockings as explained above and outputs a blocking arrangement selecting signal 102 for selecting the determined blocking. Here, it is important to enhance the concentration of power, on the loss frequency coefficients in the transform coding. For this purpose, it is effective to evaluate the amplitude of high frequency components in each blocking and select the blocking having the minimum amplitude.

In one of the evaluation methods, a weight is multiplied with the pixels of each line and the obtained values are then totaled. For example, the weight of +1 is given to the lines 0, 2, 4, 6 using the line numbers shown in FIG. 6, and the weight of −1 is given to the lines 1, 3, 5, 7. Thereafter, the obtained values are totaled to obtain the absolute value of the sum. Moreover, the weight +1 is given to the lines 8, 10, 12, 14, and the weight −1 is given to the lines 9, 11, 13, 15. The obtained values are then totaled to also obtain the absolute values of the sum. Both absolute values are totaled. Thus, the weighting is inverted alternately for respective lines and it is equivalent to the evaluation of the maximum frequency component when non-interlace blocking has been conducted.

Further, the weight +1 is given to the lines 0, 4, 8, 12 and the weight −1 to the lines 2, 6, 10, 14. The obtained values are totaled to obtain the absolute value of the sum. In addition, the weight +1 is given to the lines 1, 5, 9, 13 and the weight −1 to the lines 3, 7, 11, 15. The obtained values are then totaled to obtain the absolute value of the sum. These absolute values are also totaled to evaluate the maximum frequency component of the individual field blocking.

In addition, the weight +1 is given to the lines 0, 4, 1, 5 and the weight −1 to the lines 2, 6, 3, 7. The obtained values are totaled to obtain the absolute value of the sum. The weight +1 is also given to the lines 8, 12, 9, 13 and the weight −1 to the lines 10, 14, 11, 15. The obtained values are totaled to obtain the absolute value of the sum. Both absolute values are then totaled to evaluate the maximum frequency component of the split blocking.

The weight +1 is given to the lines 0, 4, 7, 3 and the weight −1 to the lines 2, 6, 5, 1. The obtained values are totaled to obtain the absolute value of the sum. Moreover, the weight +1 is given to the lines 8, 12, 15. 11 and the weight −1 to the lines 10, 14, 13, 9. The obtained values are totaled to obtain the absolute value of the sum. These absolute values are totaled to evaluate the maximum frequency component of the inverted split blocking.

In another method for evaluation of each blocking, the number of orthogonal transformed coefficients having an amplitude larger than a predetermined threshold value for the respective blockings is counted, and the blocking having the minimum number is selected.

The orthogonal transform section 11 carried out the orthogonal transform of the selected block to obtain the transform coefficients. The obtained transform coefficients are quantized in a fixed sequence by the quantizing section 12. In this case, some difference lies in the power of the coefficients depending on the type of blocking. In general, non-interlace blocking tends to be selected for a stationary region and the power is comparatively small.

Meanwhile, since the correlation between fields becomes small in a quick motion area, individual field blocking is often selected and the power is large. Moreover, split blocking and inverted split blocking are considered to be intermediate to the above two blockings. Therefore, efficiency can be improved by variably controlling quantization accuracy in accordance with the type of blocking.

The quantizing accuracy can also be controlled variably in accordance with not only the type of blocking but also the combination of actual signal power and quantization error power. In this case, it is also possible to execute variable length coding by combining the information indicating type of blocking and the information indicating quantization accuracy.

Indexes obtained by quantizing the coefficients are encoded in the coding section 13. In this case, the coefficients are scanned from those having a larger coefficient power to those having a smaller one in order to enhance the efficiency of encoding. For the coefficients having a power lower than a certain specified value, the encoding may, cease. Therefore, it is very convenient if the power distribution can be anticipated. There is a tendency with respect to the distribution of power of the coefficients that the power is increased as the frequency is lower. However, if the blocking is adaptively changing, as in the present invention, the coefficients having lower power do not always correspond to low frequency components. Then, the coding efficiency can be improved by changing the scanning sequence or path in accordance with the type of blocking.

Since the present invention is structured as explained above, the following effects can be obtained.

The coding efficiency of transform coding is improved by switching the blocking of an image signal scanned by the interlaced scanning method into an adapted blocking. Moreover, the efficient assignment of information quantity can be realized by variably controlling the quantizing accuracy of transform coefficients correspondingly to the switching of the blocking. In addition, the encoding efficiency can also be improved in transform coding by changing the scanning sequence of the transform coefficients within the block.

Figure 7:
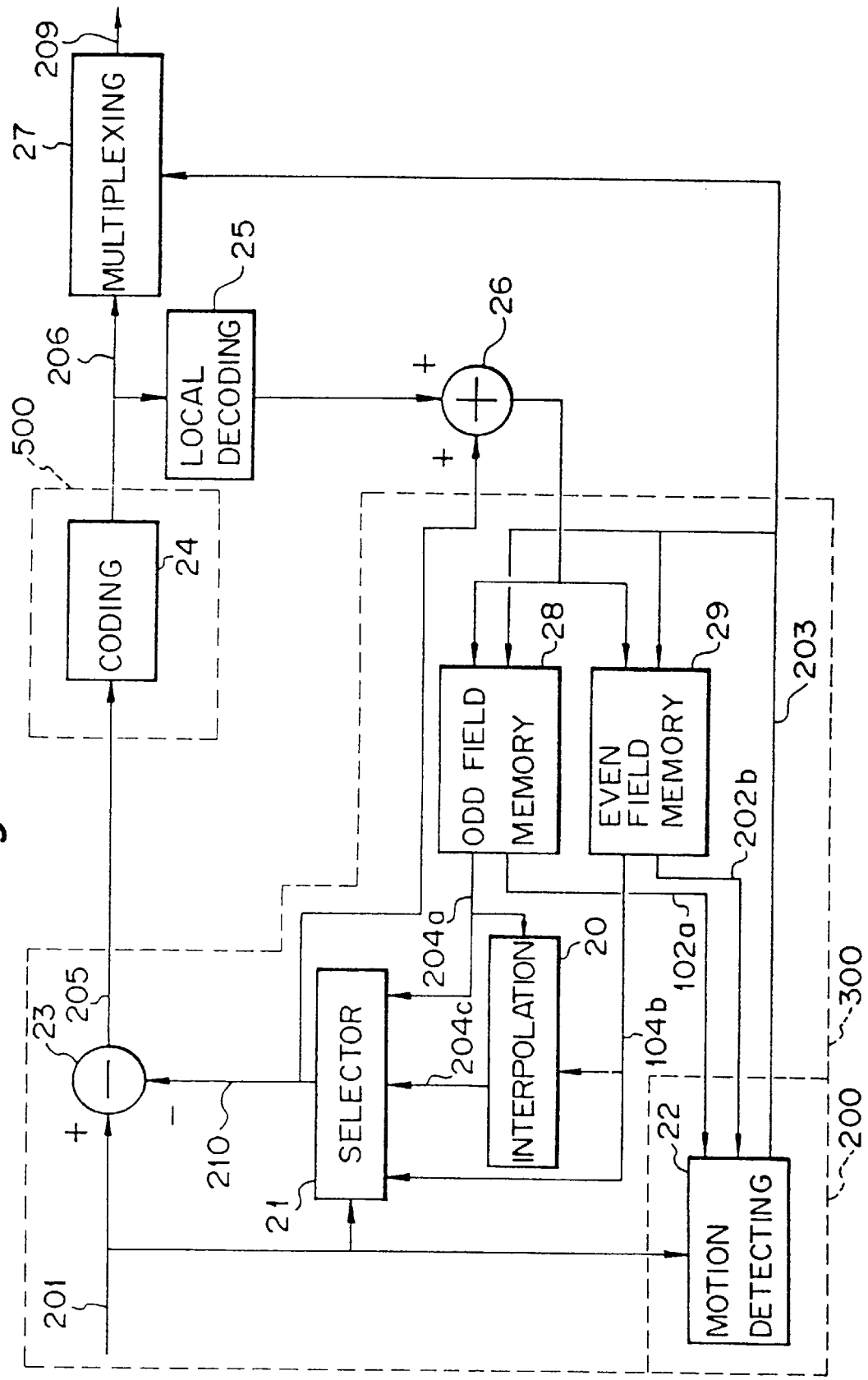
FIG. 7 is a block diagram showing the structure of an adaptive field/frame coding system of another embodiment of the present invention.

Referring now to FIG. 7, a structural diagram of an adaptive field/frame coding system according to another embodiment of the present invention is shown. The system includes an odd field memory 28 for storing local decoded signals of odd fields, an even field memory 29 for storing local decoded signals of even fields, an interpolation section 20 for interpolating a predictive signal with motion compensated from the two fields, and a selector 21 for selecting a predictive signal which gives the optimum prediction from three signals of the signals predicted from the odd and even fields and the interpolated predictive signal. In FIG. 7, sections 200, 300 and 500 enclosed by a broken line respectively denote motion detecting means, predicting error signal output means and coding means.

Figure 8:
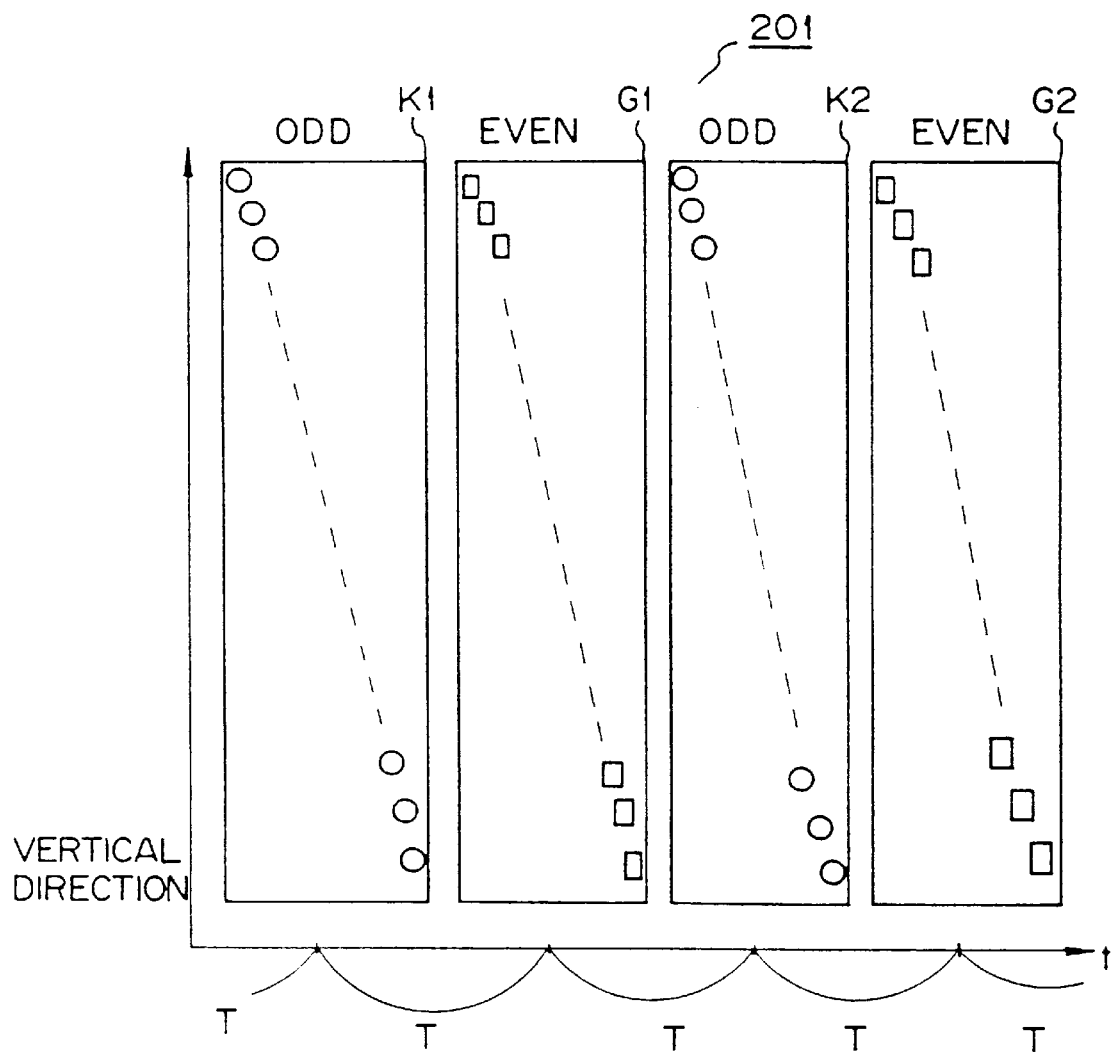
FIG. 8 is a diagram showing an exemplary input image signal.

FIG. 8 shows a profile of input image signals 201 which are scanned by the interlaced scanning method, wherein the odd and even fields are alternately applied. FIG. 8 shows the fields in the coordinates where time is plotted on the horizontal axis and vertical direction on the vertical axis. In FIG. 8, K1 indicates an odd field of the first frame, while G1, an even field of the first frame. In the same manner, K2 is an odd field of the second frame, while G2, an even field of the second frame.

FIG. 9 is a block diagram of an example of the interpolating section 20. A simple arithmetic mean of the motion compensated prediction signal 204a from the inputted odd fields and the motion compensated prediction signal 204b from the inputted even fields is obtained and is used as an interpolation predictive signal 204c.

The operation will be explained with reference to FIGS. 7, 8 and 9. Motion of the odd fields and even fields of the present frame in relation to the preceding frame is detected in units of blocks including pixels (n×m) in response to the input image signal 201 which is scanned by the interlace scanning method and includes the odd and even fields alternately. The motion of the odd fields between the present and the preceding frames is detected by searching, in the motion detecting section 22, the block which most resembles the currently processed block in the image signal 201 from the blocks adjacent 202a to the position corresponding to the currently encoded object in the already encoded odd fields stored within the odd field memory 28.

As shown in FIG. 10, for example, it is assumed that image H1 exists within one block unit (n×m) in the preceding frame, and the image moves to position H2 from position H1 in the present input image signal. The motion detecting section 22 outputs a motion vector 203 which indicates the block has moved horizontally to H2 from H1. In this case, since motion is not detected in the vertical direction, the motion vector 203 has the value of 0 with regard to vertical direction. The motion in the horizontal and vertical directions thus obtained is outputted as the motion vector 203.

The odd field memory 28 outputs a motion compensated prediction signal 204a corresponding to this motion vector 203. Similarly, compensation for motion of the even fields in the preceding frame is carried out in the motion detecting section 22, by searching the block resembling the currently processed block from the adjacent blocks 202b within the even field memory 29 and outputting the result as the motion vector 203. The motion compensated prediction signal 204b corresponding to this motion vector 203 is outputted from the even field memory 29.

The interpolation processing is carried out in the interpolating section 20 shown in FIG. 9, by using the motion compensated prediction signals 204a and 204b to generate the interpolation predictive signal 204c, signal 204a being generated by motion compensated in accordance with the motion vector 203 and provided from the odd field memory 28, and motion compensated predictive signal 204b being generated by motion compensated in accordance with the motion vector 203 and provided from the second field memory 9. A predictive signal having the minimum error signal power with respect to the currently encoding object block of the input image signal 201 is selected by the selector 21 from among the motion compensated prediction signal 204a obtained from the odd field, the motion compensated prediction signal 204b obtained from the even field, and the interpolated motion compensated prediction signal 204c, and then the predictive signal 210 is produced.

Figure 11:
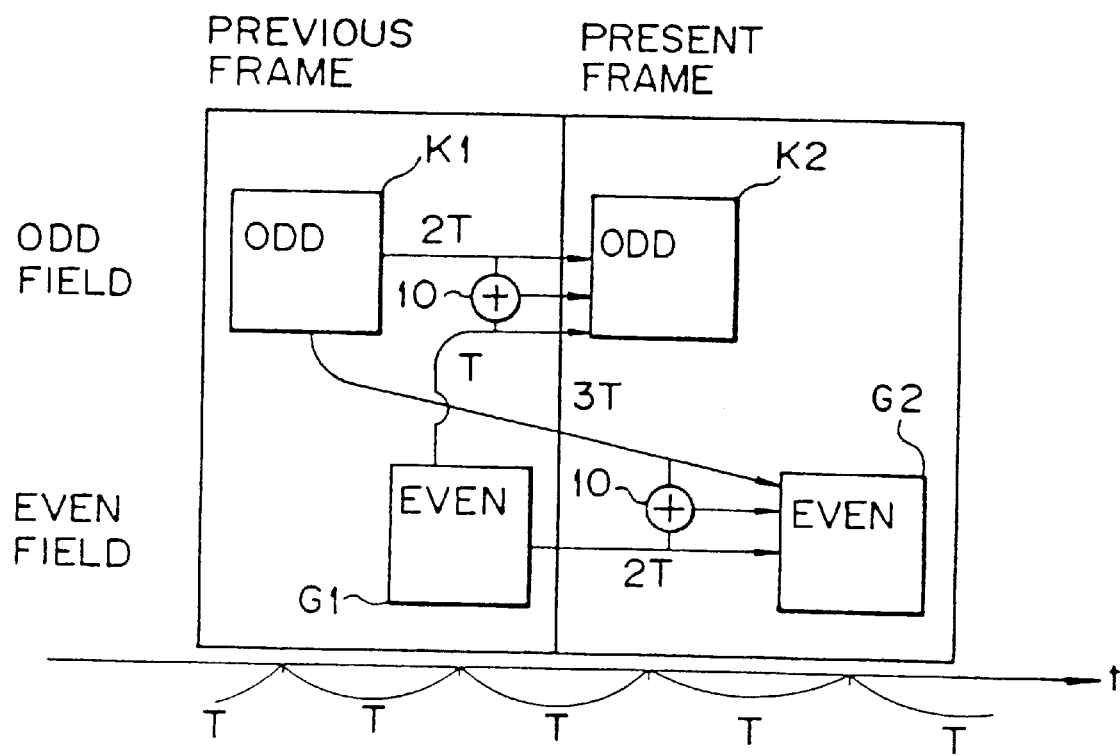
FIG. 11 is a diagram for explaining the operation for using a motion compensated predictive signal in the embodiment shown in FIG. 7.

FIG. 11 is a diagram showing the operation explained above. It is assumed that the odd field memory 28 shown in FIG. 7 stores an odd field K1 of the preceding (previous) frame, while the even field memory 29 of FIG. 7 stores an even field G1 of the preceding frame. Here, the case where an odd field K2 and an even field G2 are included in the current (present) frame of the input image signal 201 will be discussed. First, when the odd field K2 is inputted, the motion compensated prediction signal 204a from the odd field K1 of the preceding frame stored in the odd field memory 28 is provided to the selector 21. In the same manner, the even field G1 of the preceding frame stored in the even field memory 29 is provided to the selector 21 as the motion compensated prediction signal 204b. Then, the data of K1 and G1 are applied to the interpolating section 20 and the interpolation processing as shown in FIG. 9 is conducted. Thereafter, such data is supplied to the selector 21 as the motion compensated prediction signal 204c. The selector 21 compares these three kinds of motion compensated prediction signals 204a, 204b, 204c and the input image signal 201 to select the prediction signal which has the minimum error signal power.

In the same manner, the selector 21 is responsive to the even field G2 of the current frame to receive the prediction signal 204a based on the odd field K1 stored in the odd field memory 28, the motion compensated prediction signal 204b based on the even field G1 stored in the even field memory 29, and the motion compensated prediction signal 204c obtained by the interpolation process on the basis of these motion compensated prediction signals 204a, 204b based on both fields, and to select the prediction signal which has the minimum error signal power.

Figure 12:
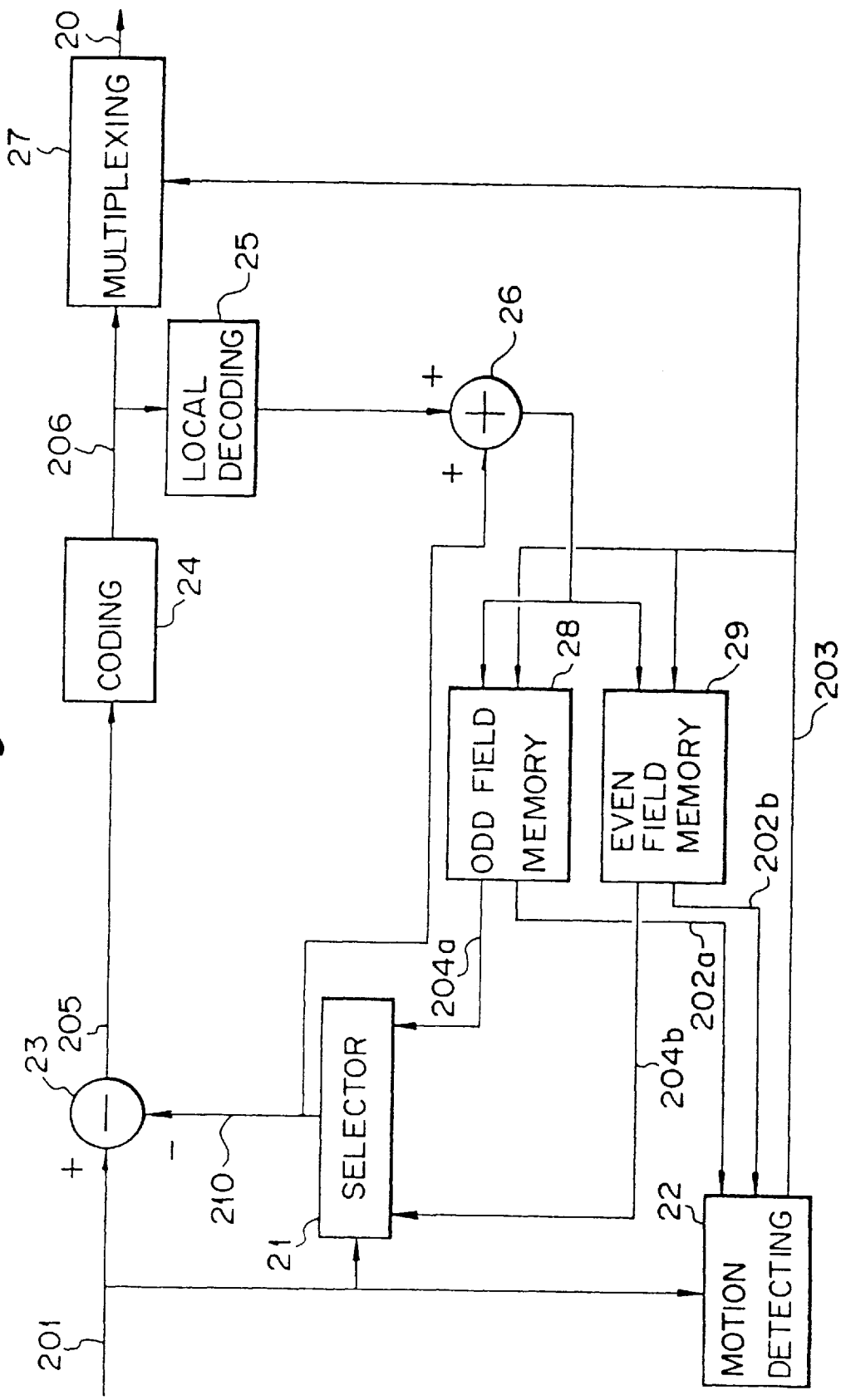
FIG. 12 is a block diagram showing the structure of an adaptive field/frame coding system according to another embodiment of the present invention.

In this embodiment (FIG. 7), the interpolation section is provided to conduct the interpolation processing based on the motion compensated prediction signals 204a, 204b from the odd field memory 28 and even field memory 29 and thereby motion compensated prediction signal 204c is produced. However, it is also possible that the interpolation section 20 is not used as shown in FIG. 12. In this case, the motion compensated prediction signal is generated in the selector 21 on the basis of the preceding odd field K1 stored in the odd field memory 28 and the preceding even field G1 stored in the even field memory 29 and the selector 21 selects the prediction signal minimizing the error signal power in these two kinds of motion compensated prediction signals 204a, 204b.

Further, in the embodiment shown in FIG. 7, the simple arithmetic mean has been used for the interpolation section, but coding ensuring higher prediction efficiency can be realized by utilizing a weighted arithmetic mean taking into consideration field distance, as will be explained hereunder with reference to FIG. 13.

Figure 13:
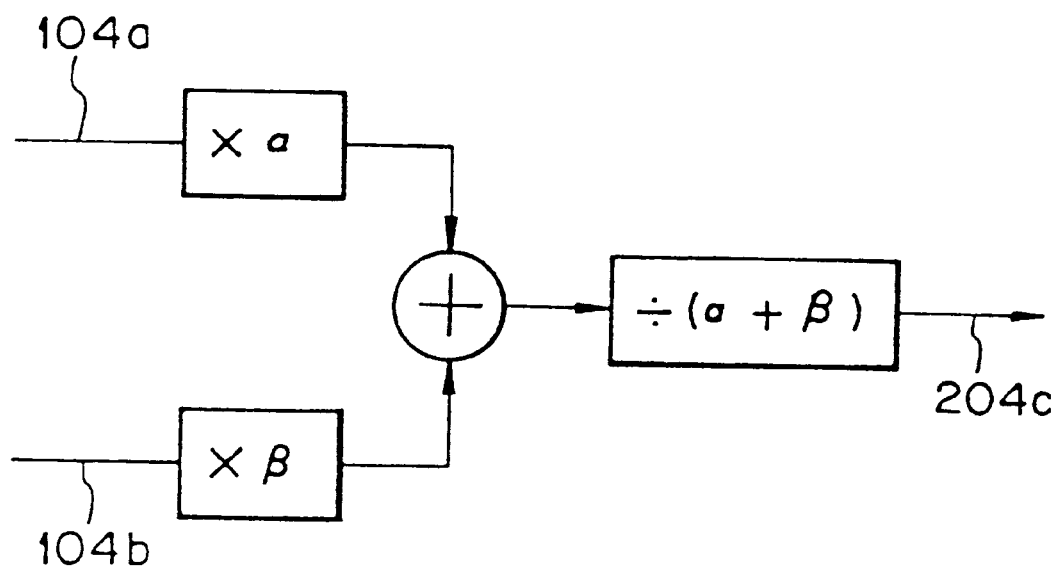
FIG. 13 is a block diagram showing another example of the interpolating section.

FIG. 13 is a block diagram of an example of the interpolation circuit 20. The motion compensated prediction signal 204a from the odd field is multiplied by a weight a based on the distance to the field to be encoded, and the motion compensated prediction signal 204b from the even field is multiplied by a weight B based on the distance to the field to be encoded. Thereafter, the arithmetic mean of these values is obtained and the output thereof is used as interpolation predictive signal 204c.

The practical value of the weighting by the interpolation section 20 in relation to the embodiment shown in FIG. 13 will be explained with reference to FIG. 11.

As shown in FIG. 11, when T is considered a unit of time for inputting an odd field or an even field, there is a time difference of 2T between odd field K1 and odd field K2. On the other hand, there is a time difference of T between even field G1 and odd field K2. Thus, the weights a and B can be determined by utilizing such time differences. For example, since the odd field K1 has a time distance of 2T, the weight $\alpha$ is set to 1. Also, since even field G1 has a time distance of T from odd field K2, the value of weight can be increased for the field having the lesser time distance by setting the value of $\beta$ to 2. In the same manner, odd field K1 has a time distance of 3T from even field G2 and even field G1 has a time difference of 2T. Thus, it is possible to give the value of weight which is proportional to the time difference by setting $\alpha$ to 2 and $\beta$ to 3 for weighting even field G2.

In the embodiment shown in FIG. 13, the weights $\alpha$ and $\beta$ are determined in the interpolating section on the basis of time distance. However, it is also possible that the weight $\alpha$ to be given to the odd field is always set, for example, larger or smaller than weight $\beta$ to be given to the even field regardless of the time distance. Further, in this embodiment, weights $\alpha$ and $\beta$ used for the odd fields are different from those used for the even fields, but the weights for the odd fields may be equal to those for the even fields. In addition, in this embodiment, only weights $\alpha$ and $\beta$ are used, but the weights may be determined in accordance with the other coefficients, for example, a coefficient having a quadratic function or another function having particular characteristics. Moreover, weights $\alpha$ and $\beta$ do not have to be restricted only to one kind of value; it is possible that several kinds of weights $\alpha$ and $\beta$ are prepared and selected in accordance with the kind of input signal-or the characteristic of input signal.

Another embodiment of the present invention will be explained with reference to FIG. 14.

Figure 14:
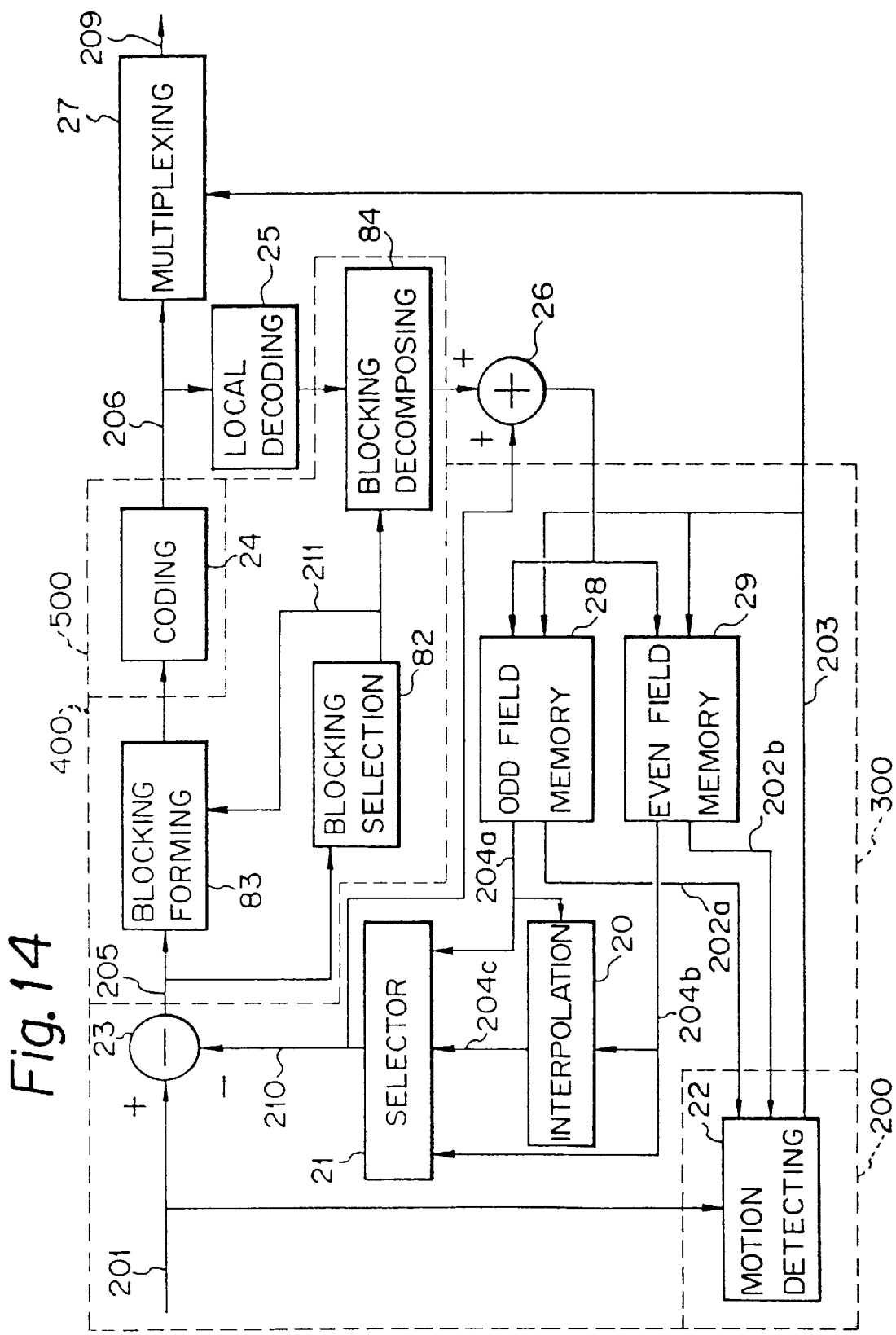
FIG. 14 is a block diagram showing an adaptive field/frame coding system according to embodiment of the present invention.

The embodiment shown in FIG. 14 comprises a blocking selection section 82 for selecting between an individual blocking of a prediction error signal for the odd and even fields and a non-interlace blocking including both odd and even fields; a blocking forming section 83 for conducting the blocking in accordance with the output of the blocking selection section 82; and a blocking decomposing section 84 for decomposing the blocking to form the original field in accordance with the block selection output. Section 400 enclosed by a broken line denotes blocking means and the other sections 200, 300, 500 are similar to those shown in FIG. 7.

Figure 15:
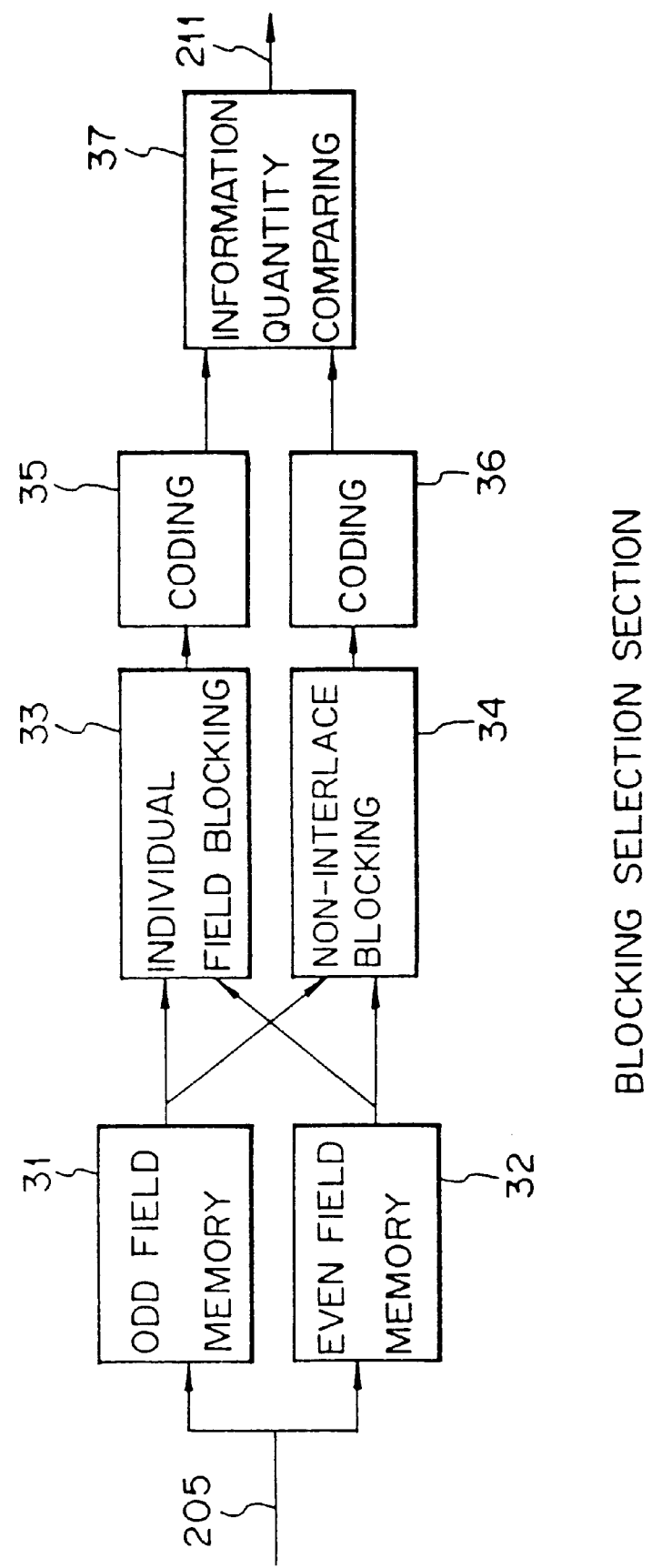
FIG. 15 is a block diagram showing an example of the structure of the blocking selection section.

FIG. 15 is a block diagram of an example of the blocking selection section 82. The prediction error signal 205 is stored in the odd field memory 31 for the odd field and in the even field memory 32 for the even field. As shown in FIG. 16(a) and 16(b), a block of p=16, q=16 is considered. The individual field blocking section 33 executes the blocking including the pixels of either of the odd or even field within the block of (p pixels×q lines), and these pixels are encoded in a coding section 35. As shown in FIG. 16(c), a non-interlace blocking section 34 executes the blocking of (p pixels×q lines) included in the block by alternately arranging the pixels of both odd and even fields, and these pixels are encoded in a coding circuit 36. The information quantity comparing section 37 compares the quantity of data encoded in the coding section 35 and the coding circuit 36, and outputs a blocking selection signal 211 indicating the blocking having the least amount of information.

Figure 17:
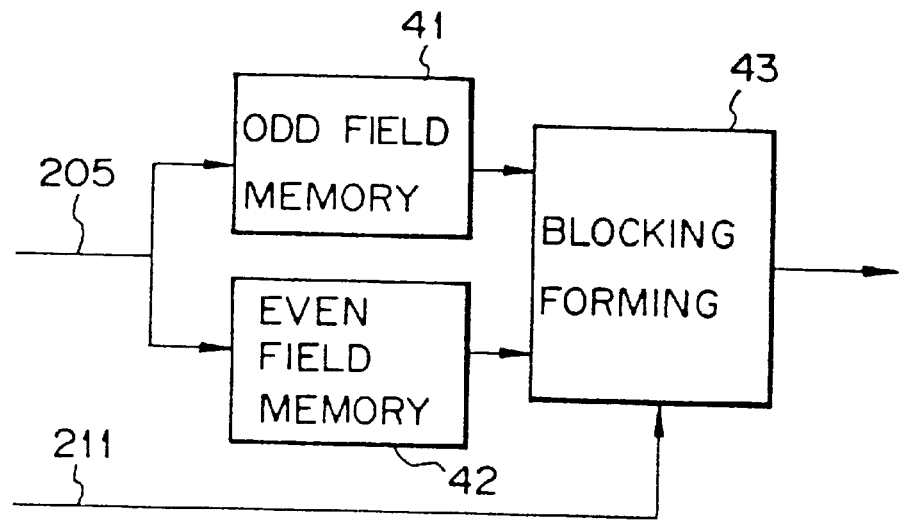
FIG. 17 is a block diagram showing a structural example of the blocking forming section.

FIG. 17 is a block diagram of an example of the blocking forming section 83. The prediction error signal 205 is stored in the odd field memory 41 for the odd field and in the even field memory 42 for the even field. In accordance with the blocking selection signal 211 supplied from the blocking selection section 82, the blocking forming section 43 selects the blocking of the prediction error signals stored in the odd field memory 41 and even field memory 42 from the blocking including pixels of either of the odd or even field within the block of (p pixels×q lines) and the blocking including pixels of both odd and even fields within the block of (p pixels×q lines), and then outputs the blocked prediction error signal.

Figure 18:
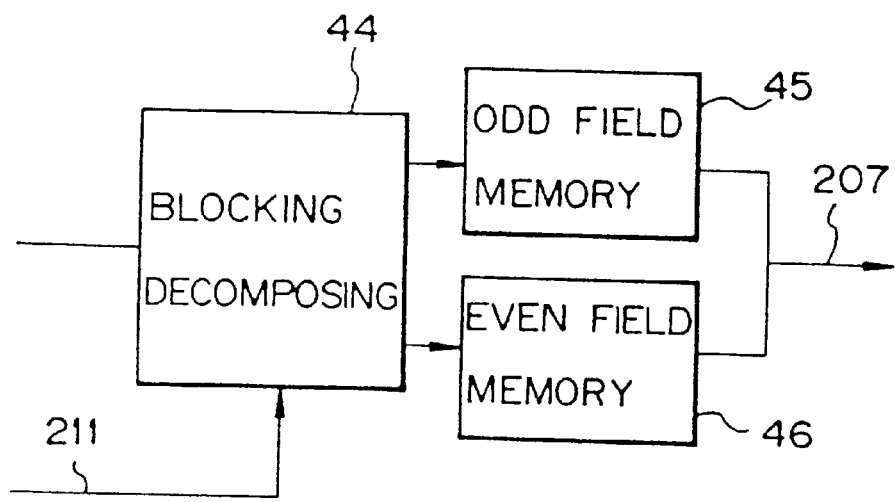
FIG. 18 is a block diagram showing a structural example of the blocking decomposing section.

FIG. 18 is a block diagram of an example of the blocking decomposing section 84. The data decoded by a local decoding circuit 25 is applied to the blocking decomposing section 44 in which the blocking is decomposed in accordance with the blocking selection signal 211 from the blocking selecting section 82, and the decomposed block is then stored in the individual field memories 45, 46. The stored data is supplied as a decoded error signal 207.

The operation of this embodiment is explained hereunder.

The prediction error signal 205 obtained by subtracting the prediction signal 210 from an input signal 201 in a difference circuit 23 is sent to the blocking forming section 83 shown in FIG. 17 and to the blocking selection section 82 shown in FIG. 15. The blocking selection section 82 produces the blocking selection signal 211 for selecting the blocking including the pixels of either the odd or even field in the block of (p pixels×q lines), or the blocking including the pixels of both odd and even fields in the block of (p pixels×q lines). The blocking forming section 83 conducts individual field blocking or non-interlace blocking in units of (p×q) blocks in accordance with the blocking selection signal 211. The blocked signal is applied to the coding circuit 24. The coding section 24 execute tie orthogonal transform and sends the encoded data 206 which is a scalar-quantized transform coefficient to both the local decoding section 25 and the multiplexing section 28.

After the inverse scalar-quantization and inverse orthogonal transform by the local decoding section 25, the data is decomposed into the odd and even fields in the blocking decomposing section shown in FIG. 18 which decomposes the blocking into the fields in accordance with the blocking selection signal 211 in order to obtain the decoded difference signal 207. The local decoded signal 208 obtained by adding a predictive signal 210 to the decoded difference signal 207 in the adder 207 is stored in the first field memory 28 when it is the odd field or in the second field memory 29 when it is the even field, to detect the motion of each field of the next frame.

In this embodiment, a unit of blocks is formed of p=16, q=16, but it is desirable that the values of p and q have the following relationship with the block size n×m used by the motion detecting section 22 as explained in the embodiment shown in FIG. 7:

p=n, q=2m

Since DCT transform is often carried out in the block unit of 8 pixels×8 lines, the size of 16 pixels×16 lines combining four block units is selected as the values of p and q in the blocking forming section. In this example, since P=n, n=16 pixels. Also, since q=2m, m=8. Thus, it is desirable that the number of lines be reduced to 8 because the motion detecting section 22 detects motion for both the odd and even fields. Meanwhile, since it is possible to employ the blocking combining the odd field and even field in the blocking forming section, it is desirable to form a block of 16 lines including the odd and even fields.

Figure 19:
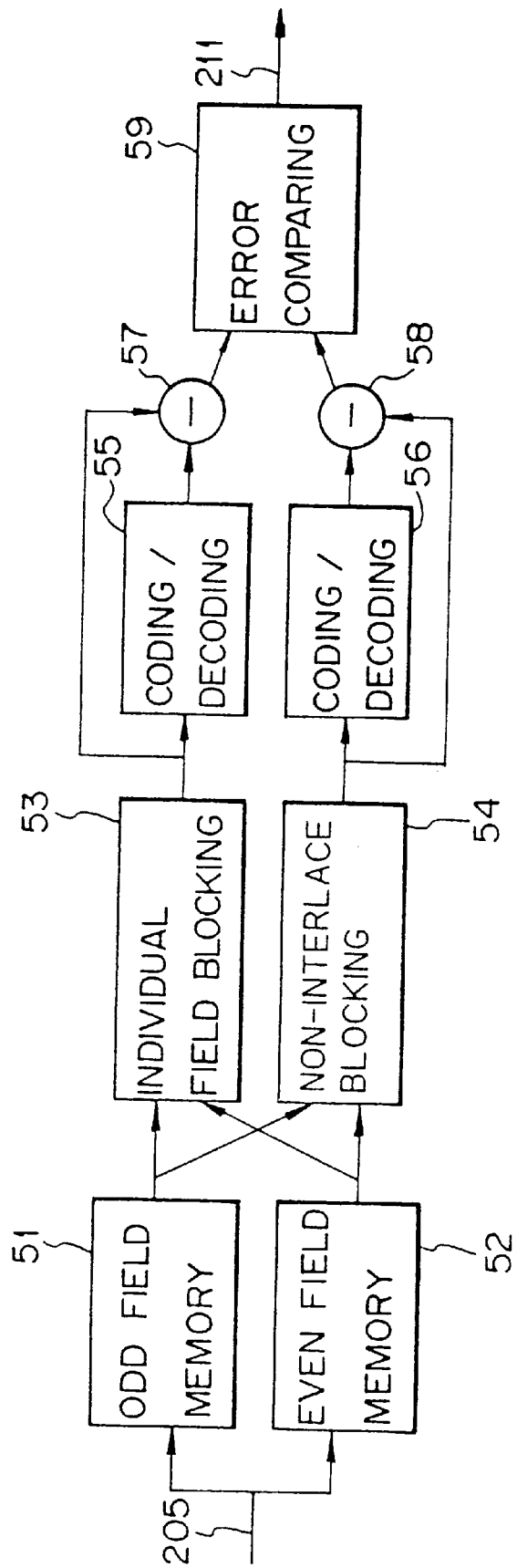
FIG. 19 is a block diagram shoving another structural example of the blocking selecting section.

In the embodiment shown in FIG. 14, the blocking has been selected by comparing the quantity of information generated as shown in FIG. 15, but coding based on the quality of encoding can be realized by selecting the blocking on the basis of the comparison of encoding quality as shown in FIG. 19.

FIG. 19 is a block diagram of an example of the blocking selection section 82. The predicting error signal 205 is stored in the odd field memory 51 for the odd field and in the even field memory 52 for the even field. The individual field blocking section 53 realizes the blocking including the pixels of either the odd field or the even field within the block of (p pixels×q lines), and the coding/decoding section 55 enables encoding/decoding. At the same time, the non-interlace blocking section 54 realizes the blocking including the pixels of both fields within the block of (p pixels×q lines), and the coding/decoding circuit 56 enables coding/decoding. The difference between the encoded/decoded data of the individual field blocking and the data just before the encoding is compared with the difference between the encoded/decoded data of the combined field blocking and the data just before the encoding, by the error comparator 59 in order to select the blocking with less errors and to provide an output as the blocking selection signal 211.

In the embodiment shown in FIG. 14, the quantity of generated information has been compared for the selection of the block, while in the embodiment shown in FIG. 19, the encoding errors have been compared. However, encoding with higher efficiency can be realized when conducting encoding utilizing the orthogonal transform, by selecting the blocking on the basis of the comparison of frequency components produced by the difference of blocking as shown in FIG. 20.

Figure 20:
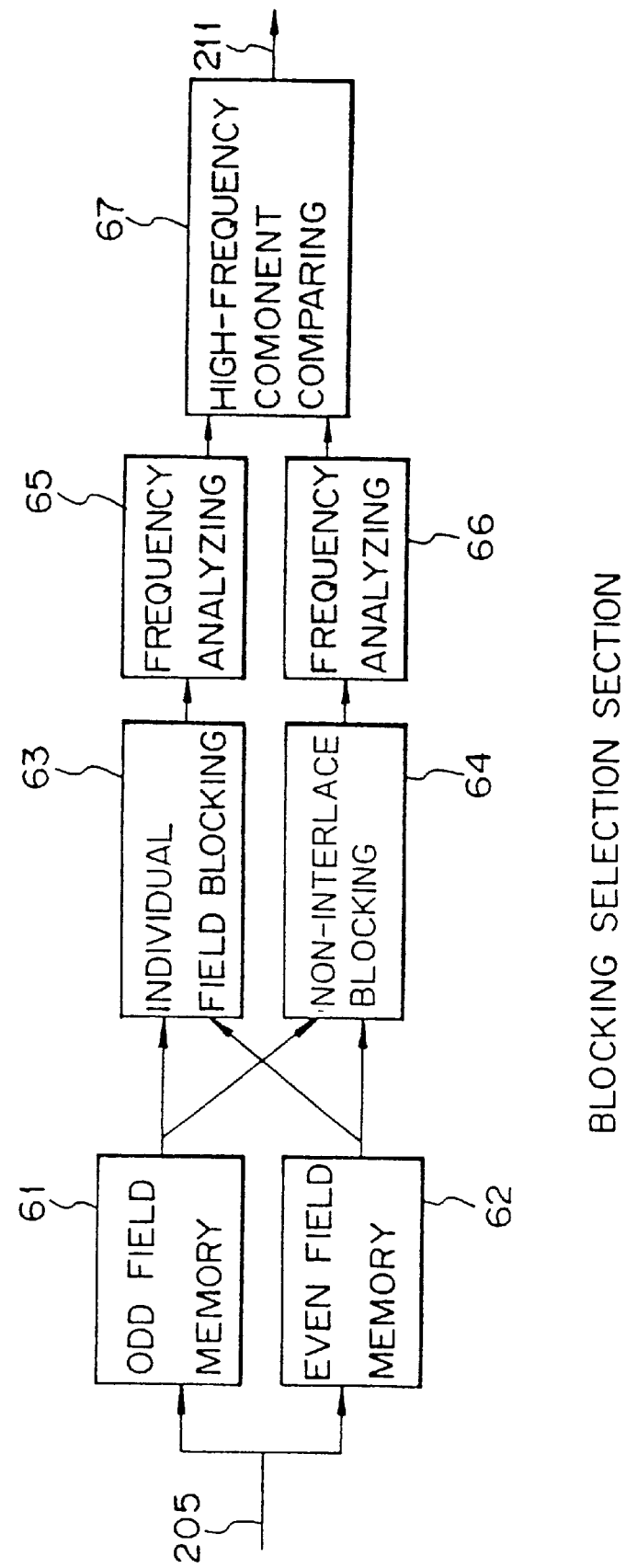
FIG. 20 is a block diagram showing another structural example of the blocking selecting section.

FIG. 20 is a block diagram of an example of the blocking selection circuit 82. The predicting error signal 205 is stored in the odd field memory 61 for the odd field and in the even field memory 62 for the even field. The individual field blocking section 63 executes the blocking including the pixels of only either the odd field or even field within the block of (p pixels×q lines), and a frequency analyzing section 65 such as that shown in FIG. 21 executes the frequency analysis. The non-interlace blocking circuit 64 executes the blocking including pixels of both fields within the block of (p pixels×q lines), and a frequency analyzing circuit 66 such as that shown in FIG. 21 executes the frequency analysis. The blocking with fewer high-frequency components is selected from the individual field blocking and the combined field blocking to output the blocking selection signal 211.

Figure 21:
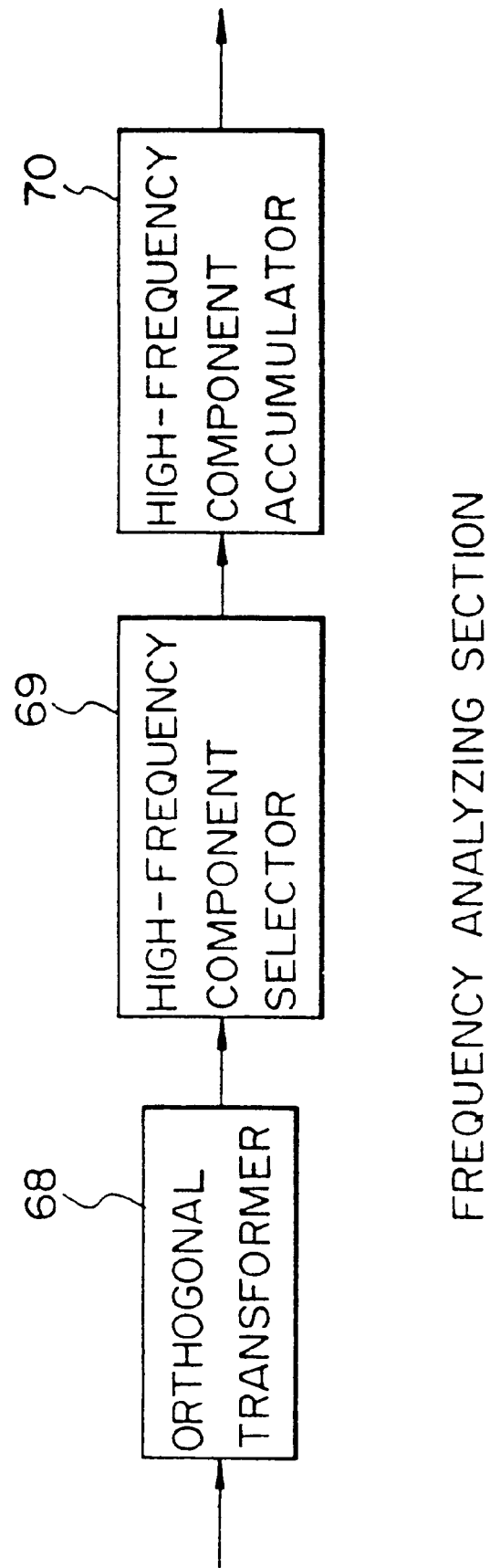
FIG. 21 is a block diagram showing a structural example of the frequency analyzing section.

FIG. 21 is a block diagram of an example of the frequency analyzing sections 65 and 66. The signal obtained by individually blocking the odd and even fields from the individual field blocking circuit 63, and the signal obtained by blocking the pixels of both odd and even fields from the non-interlace blocking section 64, are supplied to sections 65 and 66. These signals are converted to a signal in the frequency domain from a signal in the pixel domain using the orthogonal transform 68. The high-frequency components are extracted from the converted signal in the frequency domain by a high-frequency component selector 69 and the extracted high-frequency components are totaled by a high-frequency component accumulator 70. The accumulated high-frequency components are compared in a high-frequency component comparing section 67 to select the blocking with fewer amount high-frequency components.

Figure 22:
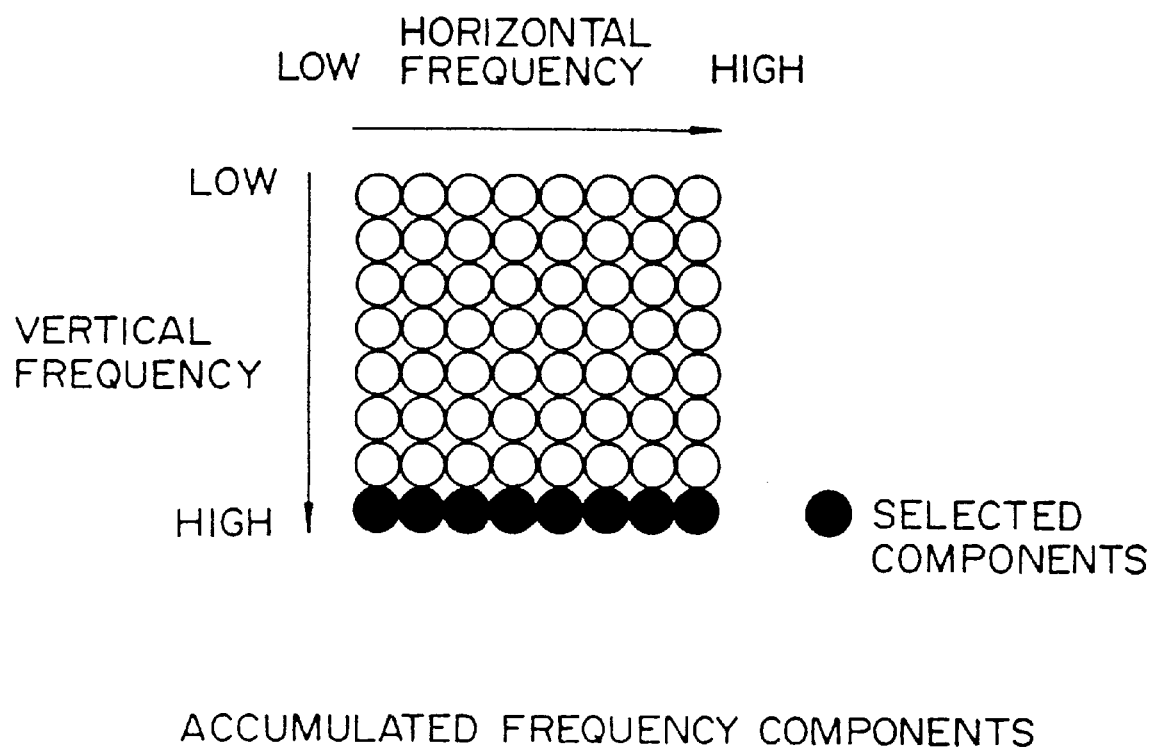
FIG. 22 is a diagram showing an example of the accumulated frequency components.

FIG. 22 shows an example of the components accumulated by the high-frequency component adder 70 from the orthogonal transformed frequency domain signal. Here, eight components, for example, having the maximum frequency component in the vertical frequency component, are selected.

Figure 23:
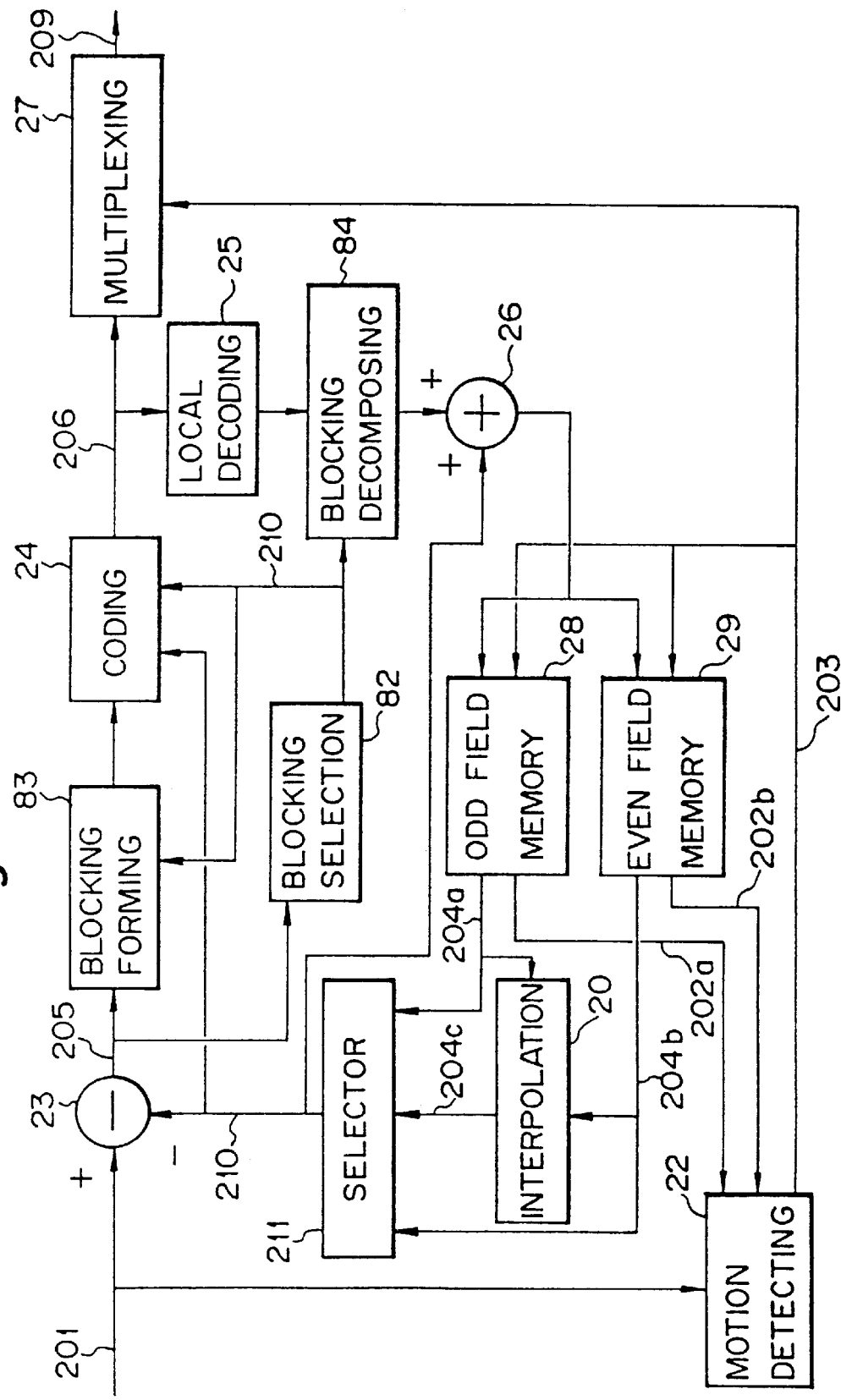
FIG. 23 is a block diagram showing another structural example of the present invention.

In this embodiment, the coding section 24 does not use the selection information of predictive signals or the selection information of blocking, but according to another embodiment shown in FIG. 23, finer control is possible and high encoding quality can be realized by inputting an output of the selector 11 as the selection signal for the predictive signal and the blocking selection signal as the selection signal for the blocking to the coding section 24 and by controlling the encoding characteristic with the selected prediction signal and the information of the selected blocking.

As explained above, the embodiment of FIG. 7 relates to a system for realizing predictive coding of an input image signal obtained by the interlaced scanning method with the motion compensation. The system includes motion detecting means for obtaining, for the odd or even field of the input image signal, the amount of displacement, in order to carry out the individual motion compensated prediction, in units of the block of (n pixels×m lines) (n and m: positive integer) from both the odd and even fields of the already encoded frame, and the prediction error signal output means for selecting, with a selector 21, the predictive signal indicating the optimum prediction from signals including a first predictive signal 204a obtained by the motion compensation from the odd field, a second predictive signal 204b obtained by the motion compensation from the even field, and a third predictive signal 204c obtained by interpolating the first and second predictive signals in order to obtain the difference from the field of the input signal and output the result as the prediction error signal.

Moreover, the embodiment of FIG. 7 is an adaptive field/frame coding system characterized in that the interpolation means for obtaining the third predictive signal is the simple arithmetic mean of the first predictive signal and the second predictive signal.

Thus, the hardware can be minimized in size and encoding with higher prediction efficiency can be realized by generating an interpolation signal of the predictive signal by simply obtaining the arithmetic mean of both predicted odd and even fields with motion compensation.

Further, the embodiment of FIG. 13 is an adaptive field/frame coding system characterized in that the interpolation means for obtaining the third predictive signal is the weighted arithmetic mean of the first predictive signal and the second predictive signal, also considering the time distance of the field used for the prediction and the field to be encoded.

Thus, encoding ensuring very high prediction efficiency can be realized by generating the interpolation signal from the weighted arithmetic mean of both predicted odd and even fields with the motion compensation, while considering the time distance of the field used for the prediction and the field to be encoded.

The embodiment shown in FIG. 14 is an adaptive field/frame coding system comprising means for enabling encoding by selecting blocking including the pixels of either the odd field or even field within the block of (p pixels×q lines), or blocking including the pixels of both odd and even fields within the block of (p pixels×q lines), in order to encode the prediction error signal for the odd and even fields of the input image signal in units of the block of (p pixels×q lines) (p and q: positive integer).

Moreover, the embodiment shown in FIG. 14 is an adaptive field/frame coding system characterized in that the blocking means for enabling encoding while selecting the blocks comprises selecting means for selecting the blocking with less information for encoding from blocking including the pixels of only one of the odd field and even field within the block of (p pixels×q lines), and blocking including the pixels of both odd and even fields within the block of (p pixels×q lines).

The embodiment shown in FIG. 19 is an adaptive field/frame coding system characterized in that the blocking means for enabling encoding while selecting the blocks comprises means for selecting the blocking with less encoding error from blocking including the pixels of only one of the odd field and even field within the block of (p pixels×q lines), and blocking including the pixels of both odd and even fields within the block of (p pixels×q lines).

The embodiment shown in FIG. 20 is an adaptive field/frame coding system characterized in that the blocking means for enabling encoding while selecting the blocks comprises selecting means for selecting the blocking with less high-frequency components included in the signal to be encoded from blocking including the pixels of only one of the odd field and even field within the block of (p pixels×q lines), and blocking including the pixels of both odd and even fields within the block of (p pixels×q lines).

In addition, the embodiment shown in FIG. 23 is an adaptive field/frame coding system characterized by enabling encoding while selecting the quantization characteristic of the transform coefficient in accordance with the selected predictive signal and the selected blocking, in the case of employing the orthogonal transformer and carrying out encoding by the quantization of transform coefficient in the coding section for the encoding in units of the block of (p pixels×q lines).

In the above embodiments, an input image signal 201 is formed of the frame including the odd field and even field. However, the use of the odd field and even field is intended to show only an example, and the field is not restricted to the odd or even field. The present invention can be useful whenever one frame is divided into fields, the odd field and even field being only examples of such fields of a frame. For instance, the present invention can also be applied to a case of storing data by dividing the frame into two fields every two lines by, for example defining the first field as the 1st and 2nd lines and the second field as the 3rd and 4th lines, and defining the first field as the 5th and 6th lines and the second field as the 7th line and 8th line, etc. Moreover, in addition to dividing a frame into two kinds of fields, such as the odd field and the even field or the first field and the second field, the present invention can also be applied to the case of dividing a frame into more than two fields, for example, three or four kinds of fields. In such a case, the number of field memories corresponds to the number of kinds of fields, and the processing explained above is carried out, for each field.

In the above embodiments, the blocking selection section selects the blocking from two kinds of blocking, including the blocking of the pixels of only one of the odd field and even field and the blocking of the pixels of both odd and even fields. However, the blocking may include various combinations when two or more fields are prepared in addition to the odd and even fields. The blocks shown in FIGS. 16(a), (b), (c) are only examples and various block forming methods may be used to form the block other than the blocks of FIG. 16.

In the above embodiments, the blocking means shown in FIG. 14 is used with the prediction error signal output means and motion detecting means. Even if the sections other than the blocking means 400 are replaced with conventional means, the 8th and 9th aspects explained above can be provided.

According to the 6th and 7th aspect explained above, a stable encoded image with high efficiency can be obtained by individually searching the motion from each field of the already encoded frame to predict each field and by conducting adaptive prediction from the searched motion compensated predictive signals (and interpolation signals).

In addition, according to the 8th and 9th aspects explained above, a stable encoded image with high efficiency can also be obtained by adaptively selecting the encoding from the blocking of the pixels of only one of the fields of the frame to be encoded, and the encoding after conducting the blocking of the pixels of the respective fields when encoding the prediction error signal.

What is claimed is:

1. A coding system for digitally encoding a motion video signal comprising:

a video memory for storing a previously input signal as field signals obtained by dividing a frame of said previously input signal into a plurality of fields;

means for outputting at least one of a plurality of predictive signals which predict a change of the input signal to be encoded based on the signals stored in said video memory;

means for interpolating between at least two of the plurality of predictive signals and for providing an interpolated predictive signal which is different from other predictive signals;

means, operatively connected to said means for outputting and means for interpolating, for subtracting the interpolated predictive signal from the input signal and producing a predictive error signal therefrom;

means, responsive to said means for subtracting, for encoding the predictive error signal to develop an encoded predictive error signal;

means for decoding the encoded predictive error signal to produce a decoded predictive error signal; and means for generating a reproduced video signal to be stored in said video memory based on the decoded predictive error signal and the predictive signal.

2. The coding system of claim 1 wherein said encoded predictive error signal is output from said coding system to form an encoded motion video signal.

3. The coding system of claim 1 wherein said video memory includes first and second field memories.

4. The coding system of claims 1 wherein said means for encoding encodes the predictive error signal into a block encoded predictive error signal;

wherein said means for decoding decodes the encoded predictive error signal in blocks; said system further comprising, a block deformer for deforming said decoded block into the predictive error signal which includes pixels of one or both of said plurality of fields.

5. The coding system of claim 4 wherein said means for encoding encodes each block of predictive error signal based on a selected one of plural scanning orders.

6. The coding system of claim 5 wherein said scanning order is selected to improve encoding efficiency.

* * * * *